(12) United States Patent
Rieger et al.

(10) Patent No.: US 6,999,491 B2
(45) Date of Patent: Feb. 14, 2006

(54) HIGH INTENSITY AND HIGH POWER SOLID STATE LASER AMPLIFYING SYSTEM AND METHOD

(75) Inventors: Harry Rieger, San Diego, CA (US); Serge Cambeau, San Diego, CA (US)

(73) Assignee: JMAR Research, Inc., San Diego, CA (US)

( * ) Notice: Subject to any disclaimer, the term of this patent is extended or adjusted under 35 U.S.C. 154(b) by 251 days.

(21) Appl. No.: 09/907,154

(22) Filed: Jul. 16, 2001

(65) Prior Publication Data

US 2002/0018288 A1 Feb. 14, 2002

Related U.S. Application Data

(63) Continuation-in-part of application No. 09/689,539, filed on Oct. 12, 2000, now abandoned.
(60) Provisional application No. 60/159,521, filed on Oct. 15, 1999.

(51) Int. Cl.
H01S 3/091 (2006.01)
H01S 3/094 (2006.01)

(52) U.S. Cl. .............................. 372/75; 372/69; 372/70
(58) Field of Classification Search .................. 372/69, 372/70, 75
See application file for complete search history.

(56) References Cited

U.S. PATENT DOCUMENTS

| 4,785,459 A |   | 11/1988 | Baer |
|---|---|---|---|
| 4,943,782 A |   | 7/1990 | Stephens et al. |
| 5,033,058 A | * | 7/1991 | Cabaret et al. ............... 372/75 |
| 5,043,998 A |   | 8/1991 | Cooper et al. |
| 5,048,030 A |   | 9/1991 | Hiiro |
| 5,195,150 A | * | 3/1993 | Stegmueller et al. ......... 385/33 |
| 5,322,361 A | * | 6/1994 | Cabib et al. ................ 374/161 |
| 5,504,763 A |   | 4/1996 | Bischel et al. |
| 5,590,147 A | * | 12/1996 | Hobbs et al. ................. 372/75 |
| 5,640,408 A |   | 6/1997 | Jani et al. |
| 5,790,303 A |   | 8/1998 | Weston et al. |
| 5,790,574 A | * | 8/1998 | Rieger et al. ................. 372/25 |
| 5,872,804 A |   | 2/1999 | Kan et al. |
| 5,978,407 A |   | 11/1999 | Chang et al. |
| 6,100,908 A | * | 8/2000 | Nishizawa ................... 347/133 |
| 6,580,732 B1 |   | 6/2003 | Guch et al. .................... 372/18 |
| 6,594,299 B1 | * | 7/2003 | Hirano et al. ................. 372/75 |

FOREIGN PATENT DOCUMENTS

WO    WO 01/29941 A1    4/2001

OTHER PUBLICATIONS

Revised International Preliminary Examination Report dated Aug. 2, 2004 for PCT/US02/22597.
R.G. Bikmatov et al., "Polarization effects in active Fresnel rhomb zig–zag slab amplifier", Conference on Solid State Lasers for Application to Inertial Confinement Fusion, Proceedings of SPIE, vol. 3047, pp. 171–177 (Oct. 22–25, 1996).
Supplementary European Search Report –EP 02 75 2378 dated May 3, 2005.
JMAR Technologies, Inc., "High Power X–Ray Point Source for Next Generation Lithography," SPIE Conference, Denver, Co., Jul. 1999.

* cited by examiner

Primary Examiner—Don Wong
Assistant Examiner—Leith Al-Nazer
(74) Attorney, Agent, or Firm—Baker & McKenzie LLP

(57) ABSTRACT

Systems and methods are provided for achieving high power and high intensity laser amplification. In a four-pass optical amplifying system, a linear polarized optical beam is directed by various optical elements four times through an optical amplifier. The optical amplifier is transversely pumped by a pumping energy source that includes laser diode arrays. The pumping module and the other optical components are provided to counteract thermal lensing effects, induced thermal birefringence effects and to achieve enhanced amplification and efficiencies.

84 Claims, 10 Drawing Sheets

HIGH INTENSITY AND HIGH POWER SOLID STATE LASER AMPLIFYING SYSTEM AND METHOD

This is a continuation-in-part of U.S. patent application Ser. No. 09/689,539, filed Oct. 12, 2000, now abandoned entitled "Beam Correcting Laser Amplifier", which itself is based on U.S. Provisional Patent Application Ser. No. 60/159,521, filed Oct. 15, 1999, entitled "Beam Correcting Laser Amplifier". Priority is claimed to the above-identified co-pending U.S. Patent Application and to the above-identified U.S. Provisional Patent Application, both of which are incorporated herein by reference in their entirety.

FIELD OF THE INVENTION

The present invention generally relates to a system and a method for amplifying coherent light and, more specifically, to a system and a method for amplifying coherent light of a laser system.

BACKGROUND OF THE INVENTION

High power and high intensity laser systems are very desirable. However, such high power and high intensity lasers are very hard to obtain with a high quality beam and a short pulse duration.

Laser amplifiers take an input laser beam from an external laser oscillator and amplify the input laser beam. Increasingly more intense and more powerful laser beams are achieved by increasing amplification power. However, conventional laser amplifiers have design and performance aspects that limit and even reduce achievable power and intensity gains. At high power and high intensity, heat generated by the laser pump light can create thermal optical effects and thermal stresses in laser and amplifying systems which distort the light beam, making conventional laser and amplifying systems inefficient or even inoperable. Furthermore, the energy contained in high power and high intensity laser beams can permanently damage, if not instantly vaporize, components of conventional laser and amplifying systems.

A limit on high power and high intensity laser amplification is the B-integral effect. The B-integral effect describes the relationship between the refractive index of a material and the intensity of illumination. Thus, a light beam with a non-uniform intensity distribution, such as a Gaussian intensity profile, has higher indices of refraction in areas of higher light intensity. Varying illumination intensities and thus varying indices of refraction also occur due to non-uniform energy densities resulting from laser pumping sources. The refractive index of the material determines the phase velocity of light through it, and thus the effective optical path length. As a result, phase delays occur in the regions of higher intensity, distort the focus of the light beam and limit the gains in intensity and power. A varying index of refraction also alters the optical path of affected portions of the beam, causing the whole beam or portions of the beam to collapse into focus points. The B-integral effect becomes more pronounced under high power and high intensity amplification because of the greater variances in illumination levels.

As a result of the B-integral effects and other sources of distortion to the light beam (such as optical imperfections in the laser path), high power and high intensity amplification in conventional laser amplifiers creates regions of heat accumulation (i.e., hot spots). Hot spots occur in areas of imperfections that disrupt the laser, dissipating energy into the surrounding regions. Hot spots may also form as a result of non-uniform pumping that causes varying levels of heat (e.g., heat gradients) to develop in different regions within the amplifier. As a region heats, it further distorts the refractive index profile in the laser amplifier, leading to still greater heat accumulation. This cycle of increasing heat and distortion continues until either the laser amplifier breaks down or destructive optical interference due to, for example, phase delays, prevents further gains in intensity and power.

For at least the above reasons, conventional laser amplifier designs are prone to hot spot formation and are limited in achievable gains in intensity and power. Hot spot formation also enhances inefficiencies in conventional laser amplifiers since much of the amplifying laser light energy is lost as it is converted into waste heat. Furthermore, conventional laser amplifiers are not well designed to withstand hot spots and rapidly break down under high power and high intensity amplification, requiring expensive repair and replacement of parts.

To manage these high temperatures, a means of active heat removal is generally advantageous. Conventionally, the non-optical surfaces of the laser crystal rod are cooled by the forced convection of a fluid, which is usually water. Alternatively, these surfaces can be thermally connected to a heat sink of sufficient mass to absorb the waste heat. However, due to the geometry of the active laser volume and the relatively low thermal conductivity of the laser crystal rod, high temperatures and large temperature gradients may persist.

Accordingly, there is a need for systems and methods for amplifying light that effectively produces high power and high intensity laser beams, but minimizes the formation of harmful hot spots and/or is robust enough to withstand the hot spots that do develop.

SUMMARY OF THE INVENTION

The present invention alleviates to a great extent the disadvantages of conventional systems and methods for amplifying light. In an exemplary embodiment, the present invention provides a four pass laser amplifier that receives a polarized laser input beam from an external source, directs the input beam through four amplifying passes in an amplifier, and then allows the beam that has been so amplified to exit as a desired output. The amplifier may provide for a first polarizing beam splitter (PBS), a second PBS, a directional polarization rotator (DPR), a non-directional polarization rotator (NPR), a first reflector, a second reflector and/or a pumping module. Furthermore, although the exemplary embodiment employs four passes through the amplifier, the present invention also contemplates other even or odd numbers of amplifying passes. Furthermore, passes that are made by the laser beam through the amplifier need not be collinear.

Amplification of the input beam occurs in the pumping module that is disposed in the beam path, downstream from the two PBS's and the DPR. The pumping module includes one or more pump sources (e.g., light sources) that add optical energy to the input beam to increase its intensity and power. The one or more pump sources may include, for example, a flash pump, another type of lamp and/or a laser diode. Laser diodes can be adapted to emit in a relatively small frequency band centered around a desired frequency. Accordingly, efficiency is increased since, for example, light energy is not substantially wasted at other frequencies that might not provide effective pumping.

The pumping module may include an optical pathway that itself includes an elongated laser crystal rod including, for example, a solid state material such as yttrium-aluminum-garnet (YAG), doped with active materials such as, for example, neodymium (Nd), ytterbium (Yb), holmium (Ho), and/or erbium (Er). The active materials can be optically excited, for example, by light impinging on them from the laser diodes, so that certain electrons within atoms of such materials are temporarily excited (i.e., temporarily raised to elevated energy states). If the input beam impinges upon such excited materials before, for example, the electrons spontaneously revert to their normal, stable energy states, then that reversion can be triggered (i.e., stimulated), thereby causing a massive release of photons as a result of the electrons returning to the lower energy state. In other words, the laser crystal rod is pumped by the laser diodes, thereby creating corresponding excited atoms that give up quanta to the radiation field via induced emission. The stimulated or induced emission provides a phase-coherent amplification mechanism for the input beam.

Individual laser diodes are used in the laser amplifiers and emit, for example, a rectangular-shaped beam of light, although other shapes are also contemplated by the present invention. These diodes may be mounted in longitudinal rows comprising diode bars. A plurality of such bars are mounted adjacent to each other (with the diodes mutually oriented in the same direction in a matrix) forming a laser diode array. These arrays are then positioned in a desired configuration opposite the laser crystal rod so that the diode light can impinge upon and pump the rod. Each laser crystal rod is paired with at least one set of laser diode arrays within an amplifier stage. Multi-stage amplifiers, including, for example, a pre-amplifier stage and amplifier stages arranged in series and/or parallel, are contemplated.

In an exemplary embodiment, the present invention provides that the pumping efficiency is enhanced by using an odd number of laser diode arrays disposed around the laser crystal rod. For example, in an amplifier stage having an odd number of regularly-spaced, circumferentially disposed arrays, no two arrays are disposed opposite each other (i.e., at 180° to each other) around the longitudinal axis of the laser crystal rod. In addition, reflectors disposed between the laser diode arrays can reflect pumping energy that passes unabsorbed through the laser crystal rod, back into the active medium.

The present invention has an advantage in supplying substantially uniform pumping energy in the laser amplifier. Pumping uniformity may be improved by increasing the number of laser diode arrays disposed around the circumference of the laser crystal rod, thereby decreasing the radial angle between adjacent laser diode arrays. Furthermore, increasing the number of laser diode arrays increases the total amount of available pumping energy (by increasing the number of input energy sources) and enhances amplification. Accordingly, in an exemplary embodiment, the present invention may provide, for example, five or more laser diode arrays.

The present invention may also provide one or more cylindrical lenses and/or mirrors that direct the emissions from the laser diodes. As a result, amplification efficiency improves since more pumping energy reaches the laser crystal rod where it can amplify the input beam. Pumping uniformity is further improved by disposing the lenses and/or mirrors so that the focal points of the pumping energy are, for example, at a distance away from the surface of and outside of the laser crystal rod. In this manner, when the pumping light reaches the laser crystal rods, it is unfocused and accordingly, dispersed evenly across the diameter of the laser crystal rod. The present invention also contemplates the use of aspherical lenses to further improve amplifier performance.

In an exemplary embodiment, the present invention uses a plurality of laser crystal rods aligned along their long axes. This multi-stage configuration allows for increased amplification of the input beam by increasing the number of pumping energy sources successively amplifying the same light beam. In addition, multi-stage configurations may benefit by adjusting for distortions, for example, resulting from thermal lensing effects and/or birefringence effects.

In an exemplary embodiment, the present invention provides laser diode bars and/or individual laser diodes that are selected to have substantially identical characteristics (e.g., substantially similar peak output intensities and wavelengths). The laser diode bars and/or the laser diodes are then incorporated into laser diode arrays and wired so that each laser diode receives substantially identical electrical input. Such laser diode arrays do not vary significantly in output power and average peak output wavelength.

The present invention also has an advantage in that the output power of the laser diode arrays may be controlled so as to insubstantially vary. In an exemplary embodiment, the present invention provides an electrical power supply for individual laser diode arrays so that output power of the laser diode arrays in each of the stages of the laser amplifier can be empirically matched. The electrical power supplies include power controlling means (e.g., a rheostat, tunable transistor, etc.) which may be monitored and controlled manually or automatically such as, for example, by a computer system employing feedback loop circuitry using, for example, sensor circuitry. In another exemplary embodiment, the present invention provides that the electrical input to each of the arrays is limited to the level used by the least powerful laser diode array. Laser diode arrays that exhibit higher power than the least powerful laser diode array may have electrical loads placed in parallel with the higher power arrays, thereby draining the proper amount of power from the higher power arrays. Thus, all of the laser diode arrays produce substantially similar output power.

In an exemplary embodiment, the present invention provides that the laser diode arrays may be oriented such that the short side of the rectangular light emitting surface of each laser diodes is disposed in parallel with the longitudinal axis of the laser crystal rod. The rectangular light emitting surface of the laser diodes has two sets of sides, the short sides and the long sides.

The length of a short side is smaller than the length of a long side. In viewing the intensity patterns of light emitted from the rectangular emitting surface of a particular individual laser diode, there is a large optical angular dispersion in a direction parallel to the short sides (i.e., the short axis or the fast axis) of the rectangular light emitting surface. Conversely, there is a small optical angular dispersion in a direction parallel to the long sides (i.e., the long axis or slow axis) of the rectangular light emitting surface. Such optical angular dispersion can be approximately analyzed as a two-dimensional single slit diffraction pattern in which optical angular dispersion is approximately proportional to the wavelength of the emitted light and approximately is inversely proportional to the width of the slit in a particular dimension. By perpendicularly orienting the individual laser diodes relative to the longitudinal axis of the laser crystal rod (i.e., the short axes or the fast axes of the laser diodes are parallel to the longitudinal axis of the laser crystal rod), the dispersion away from their long axes or slow axes substantially overlaps each other and effectively smoothes out the pumping intensity impinging on the laser crystal rod. The smoothing out of the pumping intensity enhances the uniformity with which the laser crystal rod is pumped. The present invention also contemplates employing other laser diode assemblies or individual laser diodes that take advantage of the above-described smoothing effects and uniformity in pumping intensity. Further pumping uniformity may be achieved by decreasing the spacing between the laser diodes in the array. Thus, for example, the exemplary embodiment naturally provides decreased spacing between laser diodes, and thus provides increased uniformity in the pumping intensities impinging upon the laser crystal rod. In addition, the exemplary embodiment also uses a larger number of laser diodes. These latter aspects improve the overall amplification and efficiency of the laser amplifier.

In an exemplary embodiment, the present invention improves the durability and robustness of the laser amplifier. The pumping source, and thus the laser amplifier, continue to operate effectively even if an isolated laser diode or an isolated laser diode bar fails. This is due, in part, to the substantial overlap of pumping intensity between substantially adjacent individual laser diodes and/or substantially adjacent laser diode bars. Thus, optical angular dispersion from the substantially adjacent laser diodes and/or the substantially adjacent laser diode bars sufficiently illuminates the portion of the laser crystal opposite the dark (damaged) bar and/or diode to compensate for the lost pumping energy. Alternatively, the pumping intensity can be selectively increased via control circuitry which may be coupled to a computer that monitors and adjusts pumping intensity (e.g., adjusts power supplied to individual laser diodes, laser bars and/or diode arrays) to compensate for the lost pumping energy in the portion of the laser crystal rod opposite the dark (damaged) laser bar and/or laser diode.

In an exemplary embodiment, the present invention achieves greater uniformity in pumping energy by providing a plurality of sets of laser diode arrays along the longitudinal axes of the laser crystal rods. Each successive set of arrays is rotated with respect to the orientation of an adjacent set of arrays, so that the pumping energy reaches the laser crystal rod or laser crystal rods in each amplifier stage from different radial directions. For example, with laser amplifiers using sets of five laser diode arrays for transverse pumping, each successive set of laser diode arrays may be rotated relative to adjacent set of arrays by 36°. Thus, laser diode arrays in adjacent amplifier stages are disposed in a radially staggered relative orientation along the laser crystal rod longitudinal axes. Note, however, that although such staggering yields symmetrical (and therefore optimum) distribution of the five arrays around the 360° circumference, other, non-symmetrical staggering arrangements can also be used.

In an exemplary embodiment, the present invention provides a rotator such as, for example, a 90° rotator, disposed between successive laser crystal rods in a multi-stage amplifier. The rotator compensates for phase and polarization changes in the input beam resulting, in part, from refractive index gradients for different polarization orientations in the laser crystal rods. In particular, the rotator changes the polarization of the light so that the refractive index gradients in one laser crystal rod counteract (e.g., substantially cancel out) the polarization changes that occur in the other laser crystal rod.

Under high average pumping conditions, the laser crystal rod may exhibit an internal heat distribution across its cross section with the highest temperatures at its axial core. Since the refractive index of the material is a function of the temperature, the refractive index within the laser crystal rod may take on a similar distribution. As a result, after reaching steady state operation, the laser crystal rod may behave like a positive lense, altering the propagation characteristics of the beam. However, it is advantageous for the beam to retain a parallel profile across the beam throughout the multiple passes through the laser amplifier in order to achieve an amplified beam having uniform power and intensity gains. Accordingly, in an exemplary embodiment, the present invention provides uniform pumping conditions across the laser crystal rods to achieve simple spherical lensing for which compensation may be achieved via, for example, a spherical lense. The present invention may also provide a compensating lensing module that may include, for example, a negative lense or, if applicable, a positive lense disposed between the first amplifying module and the second amplifying module. In an exemplary embodiment, the amplifying modules include the laser crystal rod, which includes a material that exhibits, for example, positive lensing effects under high average pumping power. The negative lense is adapted to compensate for the positive thermal lensing effects of the two laser crystal rods disposed in the amplifying modules so that the beam remains substantially parallel and collimated throughout the multiple passes. The negative lense is selected not only to inversely match the positive thermal lensing effects of the two laser crystal rods in amplifying modules, but also to withstand the rigors of laser amplification.

To minimize polarization effects within the laser crystal rods, the successive laser crystal rods in a given amplifier should have substantially similar physical characteristics. In an exemplary embodiment, the present invention provides for manufacturing the laser crystal rods for a given multi-stage amplifier from the same crystal boule. Laser crystal boules may be grown from a melt containing the active elements, which are subsequently embedded into the crystal. Some dopant concentration gradients may be established along the longitudinal direction of the crystal boule. For example, the highest dopant concentrations may be at the bottom end of the crystal boule. Coring the rods from the same longitudinal region (e.g., a transverse slice of the crystal boule) in the same crystal boule thus yields laser crystal rods having substantially identical dopant concentration profiles and other similar physical characteristics, thereby achieving even greater similarity between the laser crystal rods. Accordingly, the similarity between the laser crystal rods provides similar stress birefringence (e.g., thermal stress birefringence) that is advantageous, for example, in canceling the effects of the similar stress birefringence.

The first and the second PBS's are disposed in the laser path to transmit the original input beam, but deflect light having a polarization that is perpendicular (normal) to the original input beam polarization. The first PBS allows the original input beam to enter the laser amplifier, but directs away the fully amplified beam as output, because its polarization at that point is perpendicular to that of the input beam. As a result, the first PBS allows the first amplifying pass of the laser beam through the amplifier to occur, and finishes the fourth and final pass through the amplifier. The second PBS transmits the original input beam and (in the opposite direction) the fully amplified beam, but deflects the partially amplified beam after the second pass and prior to the third pass through the amplifier, so that it undergoes the third pass (followed by the fourth pass) for more amplification. Thus, the second PBS deflects the second pass to initiate the third pass, while not directly affecting the first or fourth passes.

A DPR is disposed in the beam path between the first and the second PBS's. The DPR includes a component or set of components that has no polarization effect on the beam travelling from the first PBS to the second PBS, while rotating the polarization of the beam travelling (after full amplification) from the second PBS back to the first PBS. As a result, the second PBS transmits light received from the first PBS, while the first PBS deflects light received from the second PBS. The DPR allows the original input beam to enter the amplifier, while rotating the polarization of the fully amplified beam so that the first PBS deflects it away as the output beam.

The DPR may include a Faraday rotator, a wave plate or some combination thereof. With respect to light traveling in the input direction, these elements are selected to impose mutually opposite polarizations so that they cancel each other out. With respect to light traveling in the opposite direction the Faraday rotator and the wave plate have an additive polarizing effect.

The NPR is in the beam path, downstream from the pumping module. The NPR rotates the polarization of the input beam 90° on two passes. As a result, the beam is orthogonally polarized in the second pass (after a cumulative 90° of rotation) so that the second PBS deflects it away to begin the third pass. The NPR also returns the beam to its initial polarization in the fourth pass (after a cumulative 180° of rotation), allowing the second PBS to transmit (rather than deflect) the beam. The NPR may include, for example, a wave plate. In an exemplary embodiment, the present invention provides a Faraday rotator which also may achieve residual birefringence compensation of, for example, the dual laser rod system.

The four-pass amplifier also may include two reflectors. The first reflector is in the beam path downstream from the NPR and returns the beam after the first and third passes to begin the second and the fourth passes. The second reflector is disposed in the deflection path of the second PBS to receive and return the beam between the second and third passes. The reflectors include optical mirrors that receive and return the input beam. Laser reflector materials in high power and high intensity applications can be fabricated from materials that operate to optically reflect and to transmit light, that can dissipate heat efficiently and/or that are structurally robust. Hard boundary reflectors such as metal-backed mirrors may be disadvantageous for certain applications since the amplified laser light may destroy the metal-backed mirrors.

In an exemplary embodiment, the present invention provides that one or both of the reflectors include a Porro prism. Porro prisms include 45°–90°–45° solid structures constructed of substantially clear materials. Porro prisms efficiently reflect the entering light energy without the need for reflective coatings. Furthermore, Porro prisms increase the uniformity of the laser beam by inverting the beam after the first and third passes through the amplifier. As a result, the beam passes through the four-pass amplifier twice in one orientation, and twice in an inverted orientation to homogenize (e.g., smooth, counteract or cancel out) imperfections in the amplification profile within the laser crystal rods.

In an exemplary embodiment, the present invention provides that the first and the second PBS's have polarizing coatings on an outside surface. In another exemplary embodiment, the present invention provides that the first and the second PBS's are solid PBS's having polarizing coatings on an interior surface. For example, the PBS might constitute a solid, cubed-shaped optically-transparent device that has a polarizing coating on an interior diagonal plane. The solid PBS's are especially applicable in the field of high-powered laser applications. High power and high intensity laser systems may produce beam intensities of, for example, a few gigawatts per square centimeter ($GW/cm^2$), which when focused, may exceed, for example, $10^{15}$ $W/cm^2$ at a particular focal plane. The positioning of the polarizing coating in a high-powered laser amplifier avoids the formation of hot spots at the air-coating boundary since the polarizing coating no longer substantially contacts air.

In an exemplary embodiment, the present invention provides a cladding layer around the circumference of the laser crystal rod to reduce diffraction effects and to improve amplification performance. The cladding layer may be a substantially clear solid-state material (e.g., a material similar to that of the laser crystal rod, but without the active element dopants). The cladding layer may be configured to improve beam quality by reducing diffraction effects of the beam that is exiting the laser crystal rod especially where, for example, the beam diameter exceeds the laser crystal rod diameter without the cladding layer.

In an exemplary embodiment, the present invention provides a fluid (e.g., water) that cools the laser crystal rod. The fluid may be contained within a housing (casing) including a substantially clear material (e.g., glass or plastic). The casing and fluid are disposed between the laser crystal rod and the pumping source. The fluid layer may undergo forced circulation to help deter localized heat accumulation. In an another exemplary embodiment, the present invention provides that the case is adapted to include or to form a lense (e.g., a positive lense) that focuses the pumping energy from the laser diodes and directs it toward the optical pathway within the laser crystal rod. The adapted case achieves the same increased efficiency that can be produced by employing lense systems and mirrors, but at reduced materials expense. The adapted casing may be an elongated unitary lense spanning the length of the laser crystal rod and surrounded by the laser diode arrays. The shape of the wall structure of the casing can then be configured using fundamental lense principles to achieve the desired lensing. Such a casing can be fabricated, for example, by using extrusion, molding or machining techniques.

In an exemplary embodiment, the present invention provides that the substrates of the first and the second reflective optical mirrors include transparent materials (e.g., sapphire or diamond) characterized by high heat conductivity. Artificial analogs (e.g., cubic zirconium) can also be used. Sapphire and diamond have the physical property of rapidly diffusing localized heat. Thus, sapphire and diamond substrates help prevent the accumulation of heat that causes hot spots. In addition, both sapphire and diamond are durable materials, thus increasing the reliability of the mirrors.

These and other features and advantages of the present invention will be appreciated from review of the following detailed description of the present invention, along with the accompanying figures in which like reference numerals refer to like parts throughout.

DETAILED DESCRIPTION OF THE INVENTION

In accordance with the present invention, a system and a method are provided that produce high power and high intensity laser beams of high quality.

I. System and Method Overview

Figure 1:
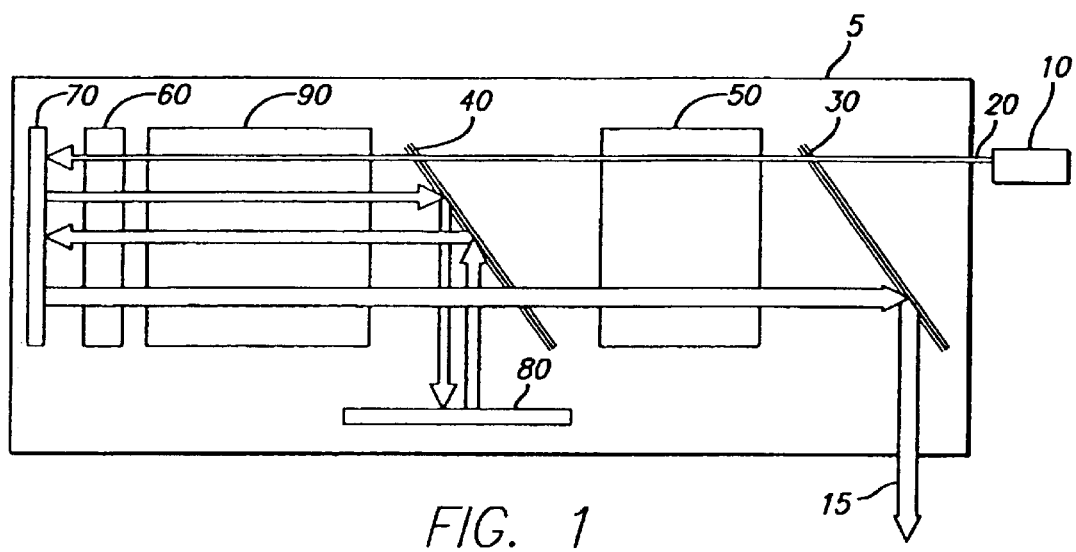
FIG. 1 is a schematic representation illustrating a light amplifying system according to the present invention.

In an exemplary embodiment as illustrated in FIG. 1, the present invention provides an external laser source 10 (e.g., a master oscillator) and a laser amplifier 5. The external laser source 10 generates an input beam 20 that is amplified by the laser amplifier 5. The laser amplifier 5 includes a first polarizing beam splitter (PBS) 30, a second PBS 40, a directional polarization rotator (DPR) 50, a non-directional polarization rotator (NPR) 60, a first reflector 70, a second reflector 80 and a pumping module 90. In the illustrated embodiment, the laser amplifier 5 is configured as a four-pass optical amplifier. However, the present invention also contemplates an n-pass optical amplifier in which n is a cardinal number. Furthermore, the present invention contemplates modifications by those skilled in the art including modifying the quantities of each of the components and orienting the components in other configurations such as, for example, in which the optical paths are collinear in part, in whole, or not at all.

In operation, the beam 20 enters the laser amplifier 5 and passes four times through the pumping module 90. On each pass, the pumping module 90 amplifies the beam 20 resulting, for example, in a more intense and more powerful beam. After being amplified four times, the beam 20 exits the laser amplifier 5 as an output beam 15. Note that although FIG. 1 illustrates the four passes as not overlapping, the beam 20 may overlap or even be collinear during some or all of the passes.

In operation, the laser source 10 which may include, for example, a pulsed laser oscillator or a laser diode, generates the beam 20. In this example, for ease in discussion, assume that the beam 20 generated by the laser source 10 is horizontally polarized (p-polarized) and oscillates as a wave parallel to the plane of the paper in FIG. 1. The first PBS 30, which has been adapted to pass p-polarized light, allows the beam 20 to pass. The beam 20 passes through the DPR 50 without a change in polarization since the DPR 50 has been adapted not to affect the polarization of the beam 20 in a direction of propagation from the first PBS 30 to the second PBS 40. Thus, in this example, the beam 20 remains p-polarized after exiting the DPR 50 and passes through the second PBS 40, which has been adapted to pass p-polarized light, without a change in polarization. The beam 20 then enters the pumping module 90 in which the pumping module 90 amplifies the beam 20 by, for example, increasing the power and the intensity of the beam 20.

Upon exiting the pumping module 90, the polarization of the beam 20 may be rotated, for example, 45° by the NPR 60 over one pass (but is more generally rotated 90° over two passes through the NPR 60). The first pass is completed by the beam 20 being reflected by the first reflector 70.

In a second pass, the NPR 60 then rotates the polarization of the beam 20 for a total of 90° from p-polarization. As a result, in this example, the beam 20 is now vertically polarized (i.e., s-polarized). Then the pumping module 90 amplifies the beam 20 for a second time. Since the beam 20 is no longer p-polarized, the beam 20 will not pass though the second PBS 40, but instead the second PBS 40 diverts the beam 20 to the second reflector 80.

In a third pass, the beam 20 is reflected by the second reflector 80 and subsequently reflected by the second PBS 40. Then the pumping module 90 amplifies the beam 20 for a third time and the NPR 60 rotates the polarization of the beam 20, for example, by yet another 45° before being reflected by the first reflector 70. The NPR 60 need not rotate the polarization of the beam 45° each pass. Instead, the NPR 60 may rotate the polarization of the beam 90° over two passes.

In a fourth and final pass, the polarization of the beam 20 may be rotated, for example, by another 45° by the NPR 60 or by 90° over last two (i.e., the third and fourth) passes, thereby returning the polarization of the beam 20 to the p-polarization. The pumping module 90 then amplifies the beam 20 for the fourth time. Because the beam 20 is again p-polarized, the beam 20 passes through the second PBS 40. Then, the beam 20 passes through the DPR 50. The DPR 50, which has been adapted to affect the polarization of the beam 20 in a direction of propagation from the second PBS 40 to the first PBS 30, rotates the polarization of the beam 20 by 90°. Thus, although the beam 20 entered the DPR 50 as p-polarized, the beam 20 exits the DPR 50 as s-polarized. Accordingly, the first PBS 30 does not pass the beam 20, but instead deflects the beam 20 that then exits the laser amplifier 5 as the output beam 15.

II. Master Oscillator

Figure 16:
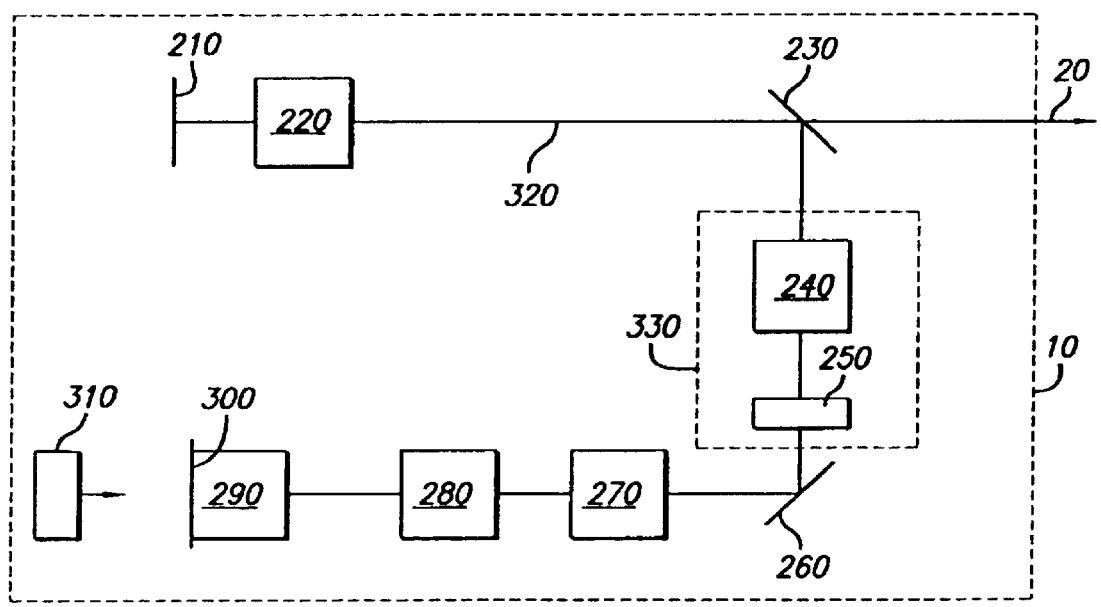
FIG. 16 is a schematic representation illustrating a master oscillator according to the present invention.

In an exemplary embodiment, the present invention provides the master oscillator 10 that generates the beam 20 that is subsequently amplified by the laser amplifier 5. As illustrated in FIG. 16, the master oscillator 10 may include a first high reflectivity mirror 210, a cavity dumper 220, a polarizer 230, a first etalon 240, a second etalon 250, a second high reflectivity mirror 260, a Q-switch 270, a mode locker 280, an Nd:YAG medium 290, a high reflectivity coating 300 and a laser diode array 310. A resonator cavity is defined by an optical path 320, the two mirrors 210, 260, the polarizer 230 and the coating 300.

In operation, the Nd:YAG medium 290 is pumped by the laser diode array 310. The laser diode array 310 may include lenses that assist by focusing emitted light for longitudinal pumping of the Nd:YAG medium 290 (e.g., a Nd:YAG laser crystal rod). The diode array may operate, for example, at approximately 808 nm and approximately 250 Watts (W) (peak) at approximately 1 kilohertz (kHz), and with an approximately 20% duty cycle. The Q-switch 270, the mode locker 280 and the cavity dumper 220 are employed to generate short pulse duration with near diffraction limited beam quality and high energy per pulse. The Q-switch 270 opens the resonator at the end of the pump pulse to form, for example, an approximately 150 picosecond (ps) laser pulse. The mode-locker forces the laser modes to form a short pulse that circulates in the resonator cavity during the Q-switch time duration. At the moment the pulse reaches its peak intensity, the cavity dumper 220 rotates the polarization of the light by 90° and the entire pulse (which becomes the beam 20) exits the resonator cavity through the polarizer 230. Such a configuration has an advantage in that almost the entire stored energy in the resonator cavity can exit the resonator cavity in the short pulse.

In an exemplary embodiment, the present invention provides the master oscillator 10 that includes an intracavity spectral filter 330. The intracavity spectral filter 330 may include the first etalon 240 and the second etalon 250. The first etalon 240 includes an etalon that is, for example, approximately 15 millimeters (mm) thick. The second etalon 250 includes an etalon that is, for example, approximately 10 mm thick. However, these values are merely exemplary (i.e., not limitations) and the present invention contemplates other values for the etalons 240, 250. The etalon 240, 250 may include, for example, a piece of glass or quartz formed like a window in which both surfaces of the window are almost perfectly parallel and flat with respect to each other. The thickness of the etalon 240, 250 relates to which particular set of wavelengths passes through the etalon 240, 250. The reflectivity of the surfaces determines the modulation depth. The etalons 240, 250 may form a spectral filter that controls the laser modes. Proper combinations of the etalons 240, 250 may provide, for example, the proper modes with which to generate a smooth pulse. A smooth pulse is advantageous in operations at high peak power since sharp spikes may damage the laser crystal rods and/or the optical components. By having a consistent pulse shape, the laser crystal rods and the optical components can operate at high intensity and high power without exceeding a damage threshold.

Empirical data indicates that approximately 0.5 millijoule (mJ) to approximately 3 mJ per pulse up at 1 kHz may be achieved using the intracavity spectral filter. Without the two etalons 240, 250, the pulse duration may not be smooth and may vary from pulse to pulse due to, for example, mode beating. A single etalon 240 or 250 may stabilize the pulse duration to approximately 700–800 ps full-width-half-maximum (FWHM), but fixed higher modulations still persist. The two etalons 240, 250 working together eliminate the fixed higher modulations and a smooth approximately 700–800 ps pulse is obtained.

III. Polarizing Beam Splitter (PBS)

In an exemplary embodiment, the present invention provides that the first PBS 30 and the second PBS 40 are substantially similar to each other. However, in another example, the first PBS 30 and the second PBS 40 may differ substantially without significantly affecting the performance of the laser amplifier 5.

The first PBS 30 and the second PBS 40 may include devices that have been adapted to allow light having a desired polarization to pass substantially unhindered while deflecting other polarizations. In an exemplary embodiment, the present invention employs polarized beam splitters that are available in a number of models from CVI Technology Inc of Albuquerque, N.Mex.

Figure 3:
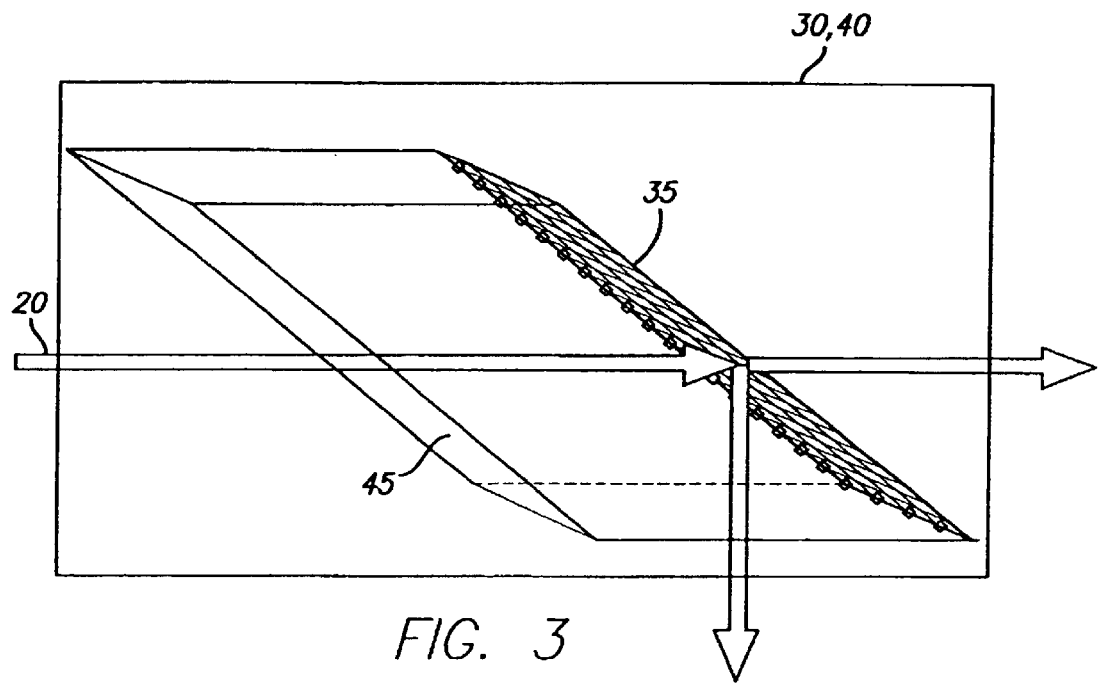
FIG. 3 is a perspective view of a polarizing beam splitter according to the present invention.

An exemplary embodiment of the PBS 30, 40 in accordance with the present invention is illustrated in FIG. 3. The illustrated PBS 30, 40 includes a thin film polarizer in which a polarizing coating 35 is applied on an outside surface of a substantially clear material 45. Under certain conditions, the beam 20 may cause the PBS 30, 40 to suffer from heat accumulation at the air-coating boundary. This heat accumulation generates thermal optical effects that may be sufficient, for example, to deflect the beam 20 from its intended direction and misalign the optical pathways of the laser amplifier 5.

Figure 2:
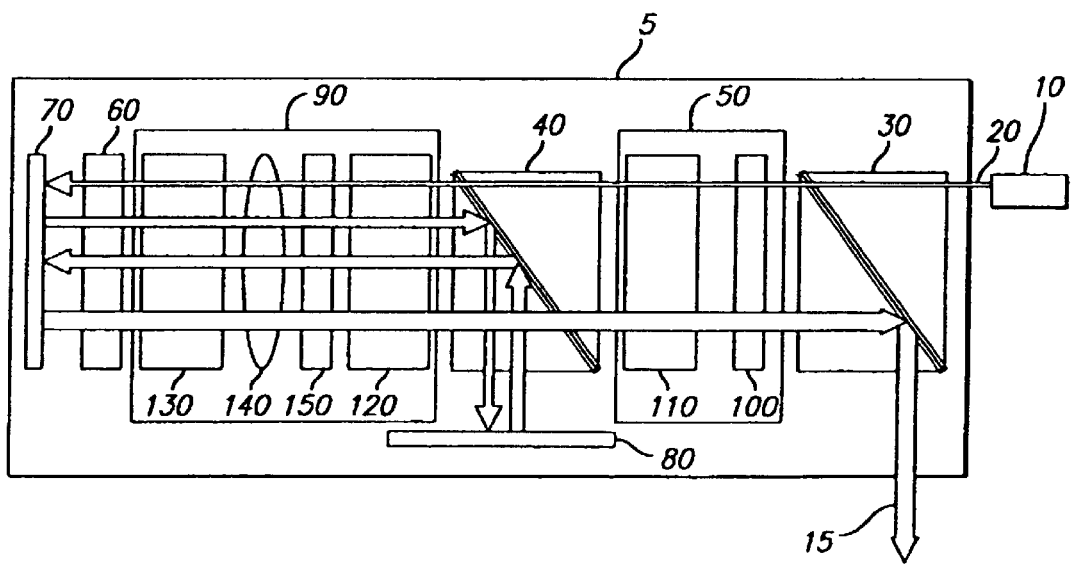
FIG. 2 is a schematic representation illustrating a light amplifying system according to the present invention.
Figure 4:
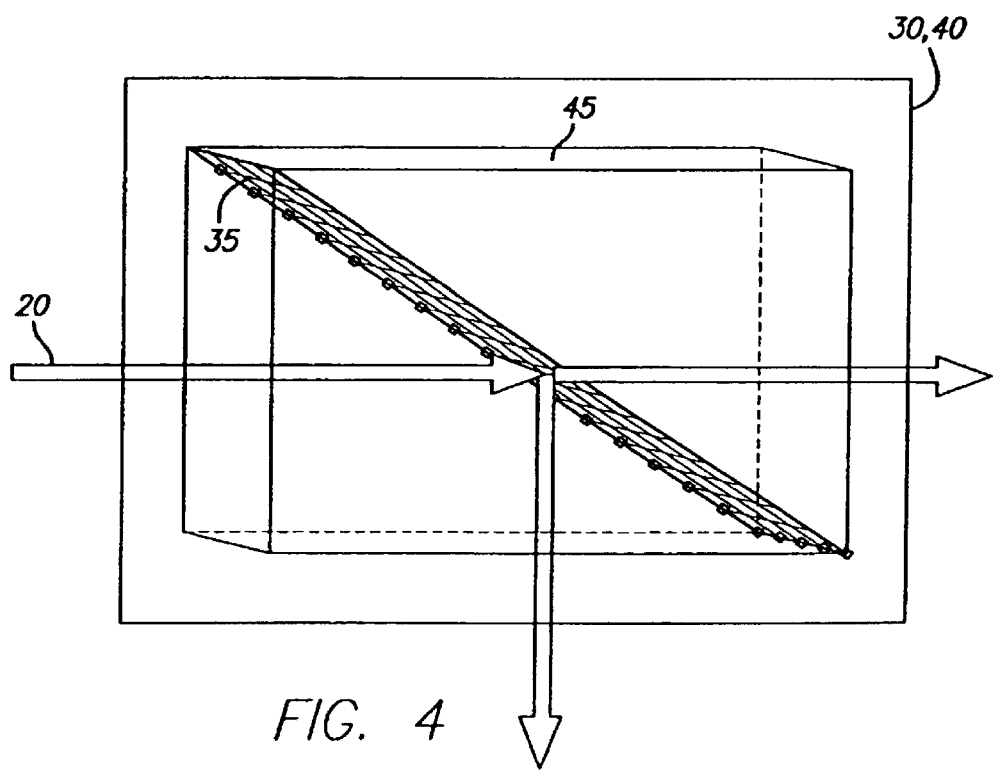
FIG. 4 is a perspective view of a polarizing beam splitter according to the present invention.

Another exemplary embodiment of the PBS 30, 40 in accordance with the present invention is illustrated in FIGS. 2 and 4. In this exemplary embodiment, the present invention provides that the PBS 30, 40 include a solid structure that has an internal polarizing coating layer. In particular, FIG. 4 illustrates the polarizing coating 35 disposed along an internal diagonal plane within the substantially clear cube-shaped material 45. Accordingly, this exemplary embodiment does not have a substantial air-coating boundary, and thus does not suffer from heat accumulation at the air-coating boundary. Thus, this exemplary embodiment of the PBS 30, 40 according to the present invention does not suffer from the above-described thermal optical effects and provides enhanced reliability and durability.

IV. Directional Polarization Rotator (DPR)

In an exemplary embodiment, the present invention provides that the DPR 50, as illustrated in FIGS. 1 and 2, has been adapted to have no substantial effect on the polarization of the beam 20 travelling in a direction of propagation from the first PBS 30 to the second PBS 40. The DPR 50 has also been adapted, for example, to rotate by 90° the polarization of the beam 20 travelling in a direction of propagation from the second PBS 40 to the first PBS 30. As a result, in the above-described example, the second PBS 40 transmits light received from the first PBS 30 while the first PBS 30 deflects light received from the second PBS 40.

The DPR 50 may include, for example, a half-wave plate 100 (e.g., a retardation plate) and a Faraday rotator 110. The half-wave plate 100 includes an optical element having two mutually orthogonal axes (i.e., a slow axis and a fast axis). The optical element transforms the polarization of the beam 20 by introducing a relative phase retardation between mutually orthogonal components of the polarization of the beam 20. In operation, the half-wave plate 100, which is appropriately oriented with respect to the polarization of the beam 20, rotates the linearly polarized beam, for example, by 45°. In an exemplary embodiment, the present invention employs the half-wave plate 100 that is available in a number of models from CVI Laser Corp. of Albuquerque, N.Mex. The selection of a particular model is well within the understanding of one skilled in the art and depends at least on the desired size of the half-wave plate 100 and the wavelength of the beam 20.

The Faraday rotator may include, for example, a glass rod having a high Verdet constant that is disposed within an axial magnetic field that affects the polarization of the beam 20. However, other types of Faraday rotators may be employed. Since light is electromagnetic radiation, this strong magnetic field rotates the polarization of the beam 20. However, the sign of the rotation is a function of the propagation direction of the beam 20 and the polarity of the magnetic field. Thus, for example, the Faraday rotator 110 as integrated into the amplifier illustrated in FIG. 2 rotates (e.g., clockwise) the polarization of beam 20 prior to the first pass through the amplifier 5; however, the Faraday rotator 110 rotates (e.g., counter-clockwise) the polarization of the beam 20 following the fourth pass through the amplifier. In an exemplary embodiment, the present invention employs Faraday rotators which are available in numerous models from Electro-Optics Technology, Inc. of Traverse City, Mich.

In operation, as the beam 20 propagates from the first PBS 30 to the second PBS 40, the DPR 50 has no substantial effect on the polarization of the beam 20 because the half-wave plate 100 rotates the polarization by 45° in one direction and the Faraday rotator 110 rotates the polarization by 45° in the opposite direction. Thus, the half-wave plate 100 and the Faraday rotator 110 effectively cancel each other out (i.e., operate destructively). On the other hand, as the beam 20 propagates from the second PBS 40 to the first PBS 30, the DPR rotates the polarization of the beam 20 by 90° transforming, for example, a p-polarized beam into an s-polarized beam. In this case, the half-wave plate 100 and the Faraday rotator 110 each rotates the polarization by 45° in the same direction. The net effect is that the half-wave plate 100 and the Faraday rotator 110 rotate the polarization of the beam 20 by 90°. In other words, the half-wave plate 100 and the Faraday rotator 110 effectively operate constructively.

V. Non-Directional Polarization Rotator (NPR)

As illustrated in FIGS. 1 and 2, the laser amplifier 5 includes the NPR 60. As previously described, the NPR 60 may rotate the polarization of the beam 20 by 45° on each pass, but more generally, the NPR 60 may rotate the polarization of the beam 20 by 90° over two passes. In an exemplary embodiment, the present invention provides that the NPR 60 include a wave plate (e.g., a quarter-wave plate) that is appropriately oriented with respect to the polarization of the beam 20 to produce a 90° rotation over a round trip. However, the properly oriented wave plate accomplishes proper polarization rotation only if the incoming polarization of the input beam 20 is linear and known. Unfortunately, the polarization of the beam 20 may not be perfectly linear nor necessarily known due to, for example, birefringence effects during pumping. Although some birefringence can be minimized through the careful design of the laser amplifier 5, birefringence can become substantial during high power and high intensity operation. Empirical data confirms that high average power operation of the laser amplifier 5 while employing the wave plate as the NPR 60 may be unsuccessful due, in part, because the laser amplifier 5 then behaves as a free running laser without the proper rotation of the polarization of the beam 20.

In another exemplary embodiment, the present invention provides that the NPR 60 include a Faraday rotator to rotate the polarization, for example, by 45° over per pass or, more generally, by 90° over two passes. The Faraday rotator has an advantage in that the residual non-uniform polarization rotation not compensated for in the first pass through the Faraday rotator can be compensated for on the second pass through the Faraday rotator. Empirical data shows that the laser amplifier 5 with the NPR 60 that includes the Faraday rotator can operate beyond a power input level of approximately 100 W.

VI. Reflectors

In an exemplary embodiment, the present invention includes the first reflector 70 and the second reflector 80 as illustrated in FIGS. 1 and 2. The reflectors 70 and 80 may be optical mirrors that are adapted to withstand and redirect the energy and intensity of the beam 20. In another exemplary embodiment, the present invention provides that the optical mirror include a substrate layer on which is applied a repeated pattern of alternating layers of two different types of coatings. The two different coating layers include materials that are transparent at least at the wavelength of the beam 20, have different indices of diffraction and may have different thicknesses. When the beam 20 impinges on the repeated pattern of alternating layers, constructive and destructive interference results from the internal reflection and transmission at each coating layer interface. Only certain wavelengths that satisfy constructive interference are reflected by the mirror. Furthermore, the reflectivity of the mirrors may be enhanced, for example, by increasing the number of alternating coating layers.

In an exemplary embodiment, the present invention provides that the mirror substrate is not an opaque material such as a metal plate, but rather is optically transparent. Under certain circumstances (e.g., under high power and high intensity laser operation), the beam 20 can instantly vaporize an opaque substrate material. Furthermore, internal birefringence within optical mirrors can create sufficient heat to itself destroy or distort the optical properties of the mirror. Accordingly, in another exemplary embodiment, the present invention provides at least one reflector 70, 80 that includes a substrate material that is transparent and has excellent heat conductivity characteristics. Thus, in yet another exemplary embodiment, the present invention provides that the substrate material include materials such as sapphire ($Al_2O_3$) or diamond (C). Such materials provide efficient heat dissipation and added structural stability and durability. Furthermore, such materials provide added resilience by not becoming distorted under extreme thermal conditions.

Figure 5:
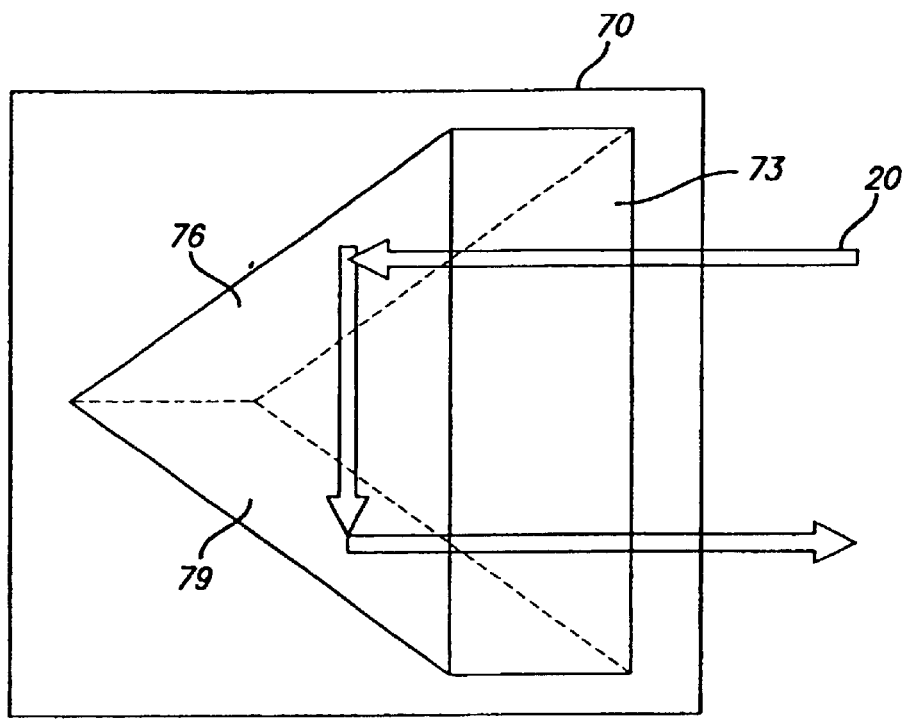
FIG. 5 is a perspective view of a Porro prism according to the present invention.

In another exemplary embodiment, the present invention provides the reflector 70, 80 that includes a Porro prism. As illustrated in FIG. 5, a Porro prism is a 45°–90°–45° prism that reflects the beam 20 with a total directional change of 180°. The Porro prism is composed of substantially clear material such as, for example, glass or plastic. The beam 20 enters the Porro prism though a long plane 73, reflects off of a first short plane 76 and then reflects off a second short plane 79, the first short plane 76 and the second short plane 79 being orthogonal.

In operation, the Porro prism inverts the cross section of the beam 20 (either vertically or horizontally). Hence, upon return passage through the amplifier, the beam 20 is inverted with respect to its orientation during the preceding amplifier pass. Such inversion causes the beam to be exposed to an inverted pumping energy profile within the laser crystal rod upon successive passes through the amplifier. Accordingly, the Porro prism has an advantage of substantially canceling many pumping irregularities, thereby helping to homogenize much of the non-uniformity in the amplifying process as well as the birefringence and power level across the cross-section of the beam 20.

VII. Pumping Module

In an exemplary embodiment, the present invention provides the pumping module 90 that includes a pumping energy source and an optical path disposed through a laser crystal rod. The pumping energy source generates, for example, light energy which is absorbed by the laser crystal rod, thereby creating a population of atoms with electrons in excited states. As the beam 20 passes through the laser crystal rod along the optical path, the energy stored in the population is transformed into, for example, stimulated emission, thereby amplifying the beam 20.

A. Laser Crystal Rod

As illustrated in FIGS. 6–10, the optical path is disposed through the laser crystal rod 160.

In an exemplary embodiment, the present invention provides that the laser crystal rod 160 include a solid state material such as, for example, YAG, doped with active elements such as, for example, Nd, Yb, Ho, Er or the like. Thus, for example, the laser crystal rod 160 may include Nd:YAG solid state material. The solid state material has an advantage in that the laser crystal rod 160 then allows for high powered and efficient pumping. Furthermore, laser crystal rods 160 such as Nd:YAG and the like commercially are widely available. One of ordinary skill in the art understands that changes in the characteristics of the laser crystal rod 160 such as composition or physical dimensions, alters the performance characteristics of the laser crystal rod 160. Accordingly, one of ordinary skill in the art would appreciate that laser crystal rod 160 is selected to provide desired performance.

In an exemplary embodiment as illustrated in FIG. 2, the present invention provides that the pumping module 90 include a first amplifying module 120, a rotator 150, a lensing module 140 and a second amplifying module 130. Each amplifying module 120, 130 includes, for example, its own laser crystal rod 160 and its own pumping energy source. Although illustrated with two amplifying modules 120, 130, the present invention also contemplates a pumping module have any desired number of amplifying modules. The amplifying modules 120, 130 may be optically positioned in series, in parallel or some combination thereof to achieve the amplification power range and profile desired for particular applications.

In an exemplary embodiment, the present invention provides that the laser crystal rods 160 in the amplifying modules 120, 130 be substantially identical. For example, the laser crystal rods 160 may have substantially similar compositional profiles provide substantially similar thermal stress characteristics which is advantageous in properly correcting the birefringence. Furthermore, localized irregularities, which may be caused by, for example, variations in doping and/or composition profiles, are factors in creating differential heating which, in turn, causes undesired optical effects. Accordingly, it is advantageous that the substantially similar compositional profiles of the crystal composition of the laser crystal rod 160 also be highly uniform.

In an exemplary embodiment, the present invention provides for a method that produces substantially similar laser crystal rods. A crystal boule that provides laser crystal rods 160 may be grown from a melt that includes active elements. In an example in which dopant concentrations gradients develop along the longitudinal direction of the crystal boule, the laser crystal rods should be taken from the same longitudinal region of the crystal boule. A plurality (e.g., a pair) of substantially similar laser crystal rods may be machined, for example, by coring from the same boule, and more preferably, from the same longitudinal region (e.g., a transverse boule slice) in the same boule, thereby yielding crystal rods having substantially similar dopant concentration profiles and substantial uniformity.

Certain crystal compositions may themselves include significant birefringence. In these applications, it may further be necessary or advantageous to orient the matched laser crystal rods in a multi-stage amplifier with respect to each other to compensate for or at least reduce this birefringence. For example, two laser crystal rods machined from the same transverse boule slice can be radially oriented (e.g., 90°) with respect to each other in order to compensate for laser crystal-induced birefringence.

B. Lensing Module

Under high average power pumping conditions, the laser crystal rod 160 that includes Nd:YAG material or like materials may exhibit an internal heat distribution across its cross section with the highest temperatures at its axial core. The heat distribution affects the refractive index of the laser crystal rod material which is a function of temperature. Hence, light propagates slowest at the axial core, and gradually faster toward the radial perimeter of the laser crystal rod 160. As a result, at steady state operation, the laser crystal rod behaves like a positive lens, altering the propagation characteristics of the beam 5. However, it is advantageous for the beam 20 to retain a parallel profile across the beam 20 throughout the four passes through the laser amplifier 5 in order to achieve an amplified beam having uniform power and intensity gains. Accordingly, in an exemplary embodiment, the present invention provides a lensing module 140 and uniform pumping across the cross section of the laser crystal rods.

In an exemplary embodiment, the present invention provides uniform pumping for simple spherical lensing in the laser crystal rods 160 and the lensing module 140 that includes a negative lense (e.g., a spherical lense). In FIG. 2, the negative lense 140 is disposed between the first amplifying module 120 and the second amplifying module 130. The amplifying modules 120, 130 include the laser crystal rod 160, which under at least high average pumping power develops positive lensing effects. The negative lense 140 is adapted to compensate for the positive thermal lensing effects of the two laser crystal rods 160 disposed in the amplifying modules 120, 130 so that the beam 20 remains substantially parallel and collimated throughout the four passes. The negative lense 140 is selected not only to inversely match the positive thermal lensing effects of the two laser crystal rods 160 in amplifying modules 120, 130, but also to withstand the rigors of laser amplification. The present invention also contemplates that laser crystal rods of other elemental compositions may generate different heat profiles across their cross sections and accordingly, different types of lenses adapted to compensate for particular thermal lensing effects may be provided. For example, in the case of a laser crystal rod having a composition that generates a negative Gaussian profile, a positive lense would be advantageous.

C. Rotator

The high average pumping of the laser crystal rods 160 creates thermal stress which manifests itself as a birefringence in the laser crystal rods 160. The heat-induced birefringence can rotate the polarization unevenly within the cross section of the beam 20. The profile of this uneven polarization rotation affects each of the four radial quadrants, and looks like a four-leaf clover. In an exemplary embodiment, the present invention provides the pumping module 90 with the rotator 150 to compensate for this uneven rotation in the polarization of the beam 20. In another exemplary embodiment, the present invention provides that the rotator 150 is a 90° rotator which is disposed between the first amplifying module 120 and the second amplifying module 130 as illustrated in FIG. 2. By using the rotator 150 to rotate the beam 20 by 90° between the amplifying modules 120, 130, birefringence that occurs in one amplifying module is countered and neutralized in the other amplifying module. However, under some circumstances, the effectiveness of the rotator 150 is a function of the matching of the laser crystal rods 160 which, due to the matching, are disposed in the same orientation with respect to the beam 20 and exhibit substantially identical thermal stress. The direction of the rotation caused by 90° rotator 150 is not a significant factor for this consideration. Accordingly, the present invention contemplates that the rotator 150 may include other devices that rotate by 90° the polarization of the beam 20. For example, the rotator 150 may include a wave plate, a Faraday rotator or some combination thereof.

D. Cooling System

In an exemplary embodiment, the present invention provides that the laser crystal rod 160 is cooled by a fluid 190 housed in a tube 170 which, at least partially, surrounds the laser crystal rod 160 as illustrated in FIGS. 6–10. The fluid cooling has an advantage in that it improves the high-powered operation characteristics of the laser crystal rod 160. The fluid 190 is a substantially clear fluid (e.g., water) that substantially does not optically absorb or reflect light impinging from the laser diodes or otherwise substantially disrupt optical pumping. Similarly, the tube 170 is a substantially clear material (e.g., glass or plastic) that also does not substantially affect pumping. In an exemplary embodiment, the fluid 190 that surrounds the laser crystal rod 160 may be stagnant according to the present invention. However, in another exemplary embodiment, the present invention provides more stable temperatures by allowing the fluid 190 to flow around the laser crystal rod 160 to prevent substantial heat accumulation. For example, laser amplifier 5 may include a mechanical pump that transports the fluid 190. However, it should be appreciated that the present invention also contemplates other means for causing the flow of the fluid 190. Additionally, conventional means may be employed to cool the fluid 190.

E. Cladding Layer

In an exemplary embodiment, a beam 20 may exhibit, for example, a Gaussian profile. Although a Gaussian profile is typical of, for example, laser operation in the fundamental mode, the present invention contemplates other profiles as well. For efficient amplification, the beam 20 should optically overfill the aperture of laser crystal rod 160. Thus, the low intensity fringe regions of the Gaussian profile are not amplified in the laser crystal rod 160. However, such overfilling of the aperture causes the beam 20, which enters with a Gaussian profile, to exit with an accentuated "top hat" profile and a concentric, ringed pattern resulting from diffraction by the circular aperture of the laser crystal rod 160. Such distortions of the Gaussian profile can limit the achievable power and intensity gains of the beam 20.

Figure 19:
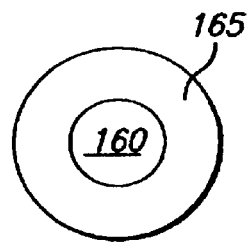
FIG. 19 is a schematic representation illustrating a cladding layer and a laser crystal rod according to the present invention.

Thus, in an exemplary embodiment, the present invention provides a cladding layer 165 around the laser crystal rod 160 as illustrated in FIG. 19. The cladding layer 165 is advantageous because the Gaussian profile of the beam 20 can be better preserved if the aperture of the laser crystal rod 160 is optically softened, thereby reducing the effect of the diffraction ring patterns. The cladding layer 165 includes an optically clear material that is adapted to transmit, but not substantially amplify and/or otherwise substantially affect, the low intensity fringe regions of the Gaussian profile. In an exemplary embodiment, the cladding layer 165 includes material having, for example, a substantially similar refractive index as the material of the laser crystal rod 160. The fringe light remains concentric with the amplified light and the diffraction effect is reduced.

In another exemplary embodiment, the cladding layer 165 includes material having a refractive index with respect to the refractive index of the laser crystal rod 160 such that fringe light is directed towards the laser crystal rod 160. Thus, light that otherwise would not have been amplified is amplified, thereby improving the efficiency of the laser amplifier 5 and increasing the intensity of the beam 20.

The cladding layer 165 may be fabricated, for example, from the same composition as the laser crystal rod 160, but undoped. After the laser crystal rod 160 is prepared, the cladding layer 165 can be applied using optical diffusion bonding. Alternatively, the cladding layer may also be applied onto the laser crystal rod 160 using conventional techniques such as conventional deposition and/or conventional growth techniques. The cladding layer 165 has a further advantage in that the cladding layer can improve the uniformity of the cooling of the laser by buffering fluctuations in the temperature of the fluid 190.

F. Pumping Source

As illustrated in FIGS. 6–12, the pumping energy source in pumping module 90 includes one or more laser diodes 180. The use of emissions from the laser diodes 180 as the source for pumping energy is advantageous in that the laser diodes 180 efficiently produce high quality pumping energy having a desired wavelength. The laser diodes 180 may include semiconductor devices that have been adapted to receive energy (e.g., electrical) and emit electromagnetic (e.g., light) energy.

Figure 11:
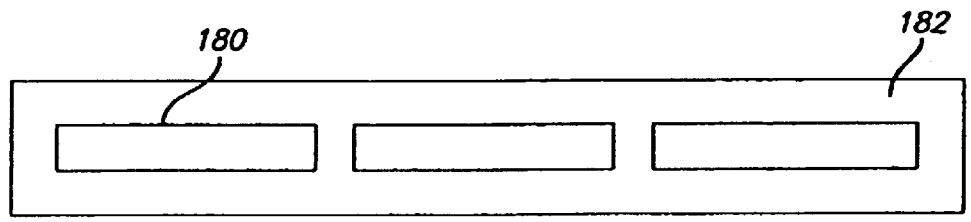
FIG. 11 is a schematic representation illustrating a laser diode bar according to the present invention.
Figure 12:
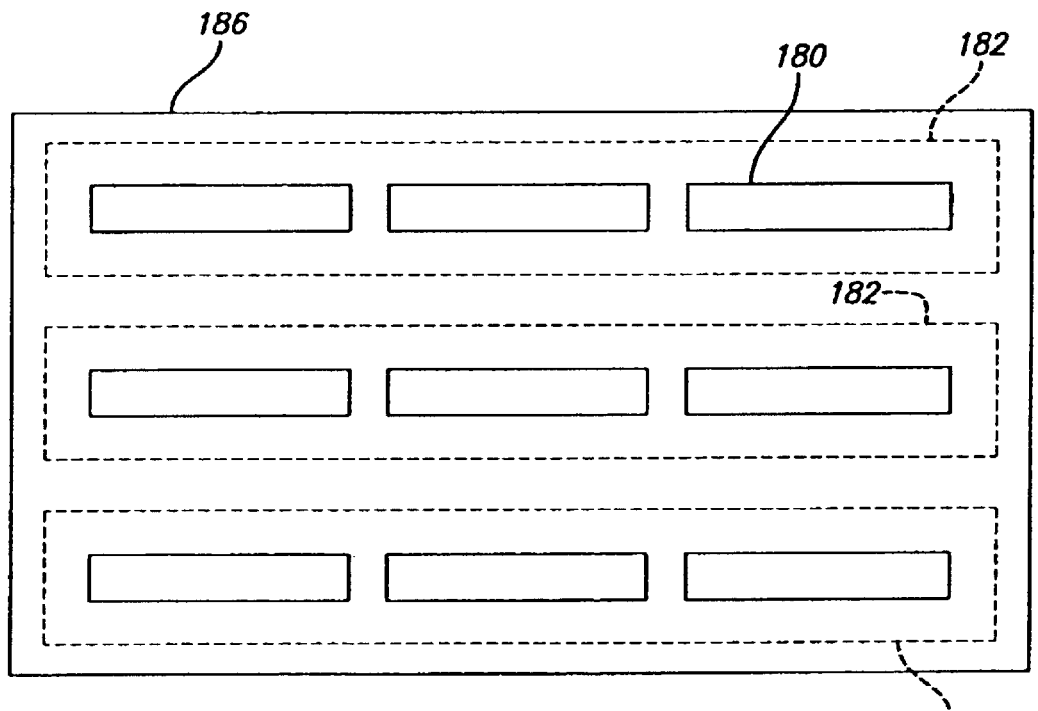
FIG. 12 is a schematic representation illustrating a laser diode array according to the present invention.

The laser diodes 180 may be fabricated into a monolithic longitudinal row that includes a laser diode bar 182 as illustrated in FIG. 11. The laser diode bar 182 may include a plurality of the laser diodes 180 disposed end to end with the diodes all facing in the same direction so that emitted light from all of them propagates in substantially the same general direction. Although illustrated in FIG. 11 as including three laser diodes 180, the present invention contemplates the laser diode bar 182 including other quantities of the laser diodes 180. As illustrated in FIG. 12, a plurality of the laser diode bars 182 can be subsequently assembled (e.g., with one laser diode bar 182 disposed on top of another laser diode bar 182), thus forming a laser diode array 184. Although illustrated in FIG. 12 as the laser diode array 184 including three laser diode bars 182, the present invention contemplates other quantities of the laser diode bars 182. In an exemplary embodiment, the laser diode array 184 according to the present invention measures, for example, approximately 1 cm by approximately 2.5 cm by approximately 6 cm. The light-emitting face of each laser diode 180 may be, for example, approximately 100 $\mu$m by approximately 1 $\mu$m. Such dimensions are merely exemplary and are not intended to limit, in any way or manner, the scope of the present invention.

The laser diode array 184 includes a housing 186 into which are mounted either the assembled laser diode bars 182, the individual laser diode bars 182 and/or individual laser diodes 180. The housing 186 includes circuitry and wiring needed to supply electrical power to the laser diodes 180. The housing 186 can also incorporate cooling systems such as, for example, cooling fluid conduits, through which a suitable cooling fluid can be circulated during operation to dissipate heat away from the laser diodes 180. The wavelength of the laser diodes 180 is, for example, approximately 805.5 nanometers (nm) with a bandwidth of less than approximately 5 nm. Other wavelengths and bandwidths generated by the laser diodes 180 are also contemplated by the present invention.

Figure 8:
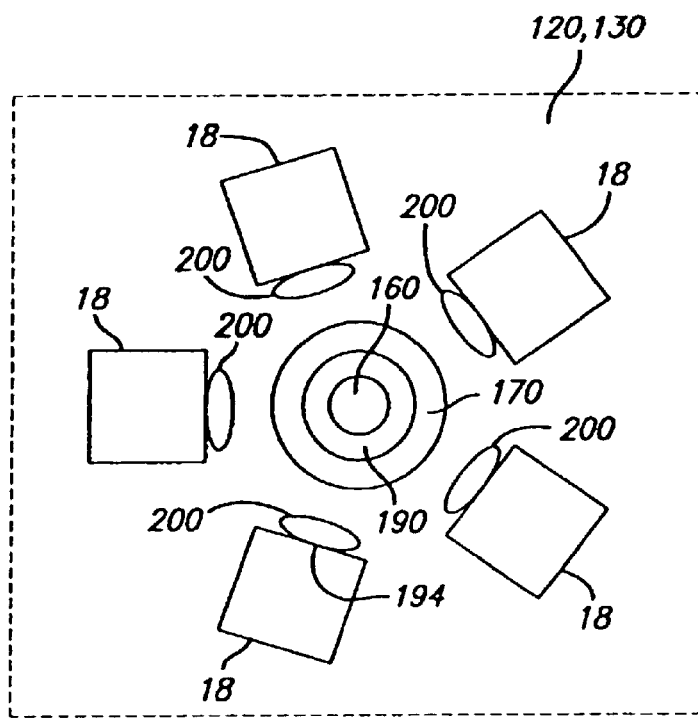
FIG. 8 is a cross-sectional view illustrating an amplifying module according to the present invention.
Figure 9:
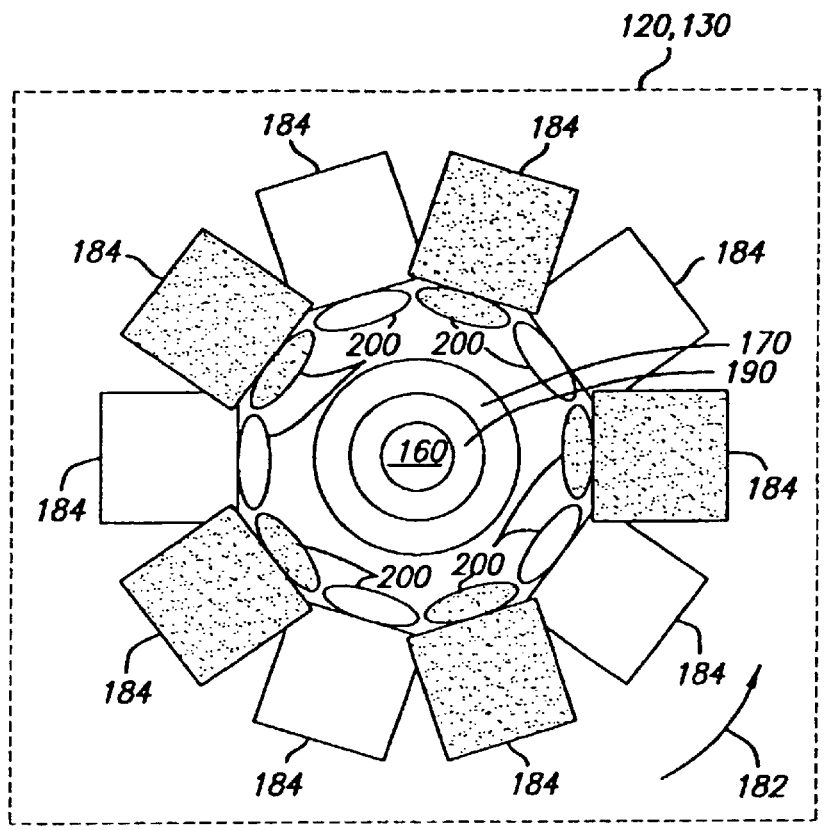
FIG. 9 is a cross-sectional view illustrating an amplifying module according to the present invention.
Figure 10:
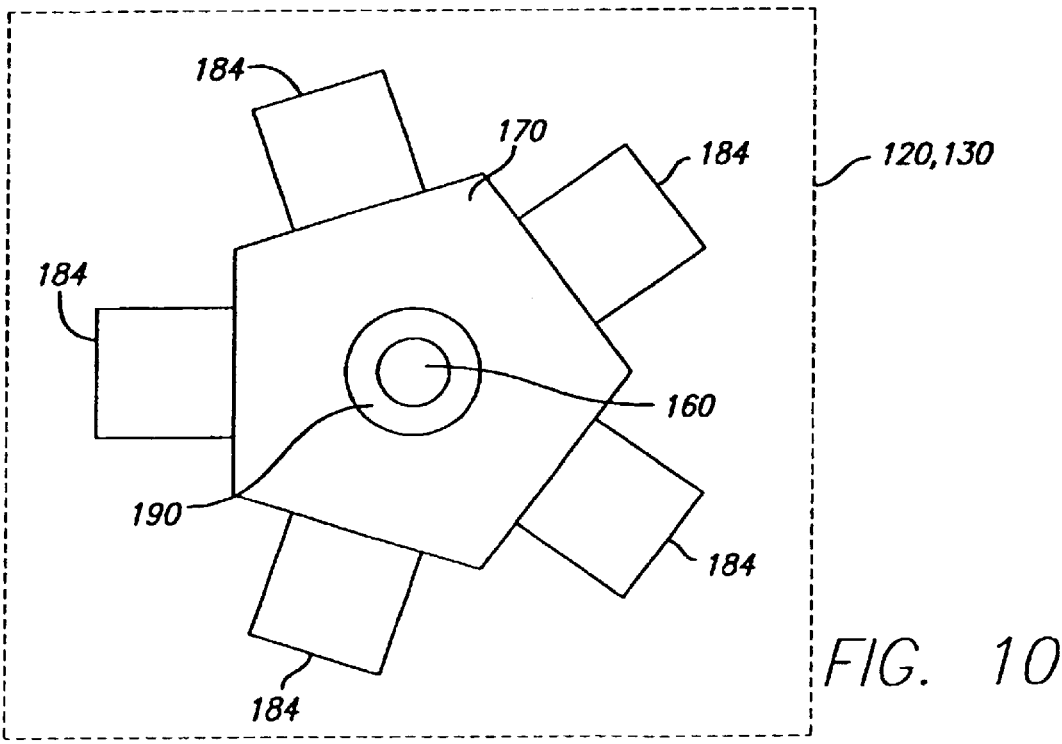
FIG. 10 is a cross-sectional view illustrating an amplifying module according to the present invention.

To effectively and efficiently pump the laser crystal rods 160 optically, one or more laser diode arrays 184 are disposed so that light emitted from the laser diodes 180 impinges on the laser crystal rod 160. As illustrated in FIGS. 8–10, the amplifying module 120, 130 includes a plurality of laser diode arrays 184 centered around the laser crystal rod 160 with each laser diode array 184 with the emitting surfaces of the laser diodes 180 disposed toward the laser crystal rod 160. In an exemplary embodiment, the present invention provides, in a particular plane that is perpendicular to the longitudinal axis of the laser crystal rod 160, an even number of laser diode arrays 184 equally spaced around the laser crystal rod 160. In another exemplary embodiment, the present invention provides, in a particular plane that is perpendicular to the longitudinal axis of the laser crystal rod 160, an odd number of the laser diode arrays 184 equally spaced around the laser crystal rod 160, thereby minimizing the possibility that pumping light passing through or around the laser crystal rod 160 will directly impinge on another laser diode array 184. Regardless of whether there is an even or an odd number of the laser diode arrays 184, they should be evenly spaced around the laser crystal rod 160 as illustrated, for example, in FIGS. 8–10. Such a configuration prevents the formation of hot spots by providing greater uniformity in applying the pumping energy to the laser crystal rod 160. However, it should be appreciated that the present invention also contemplates that the laser diode arrays 180 may be disposed in any other suitable configuration around laser crystal rod 160 depending upon the application.

Figure 13:
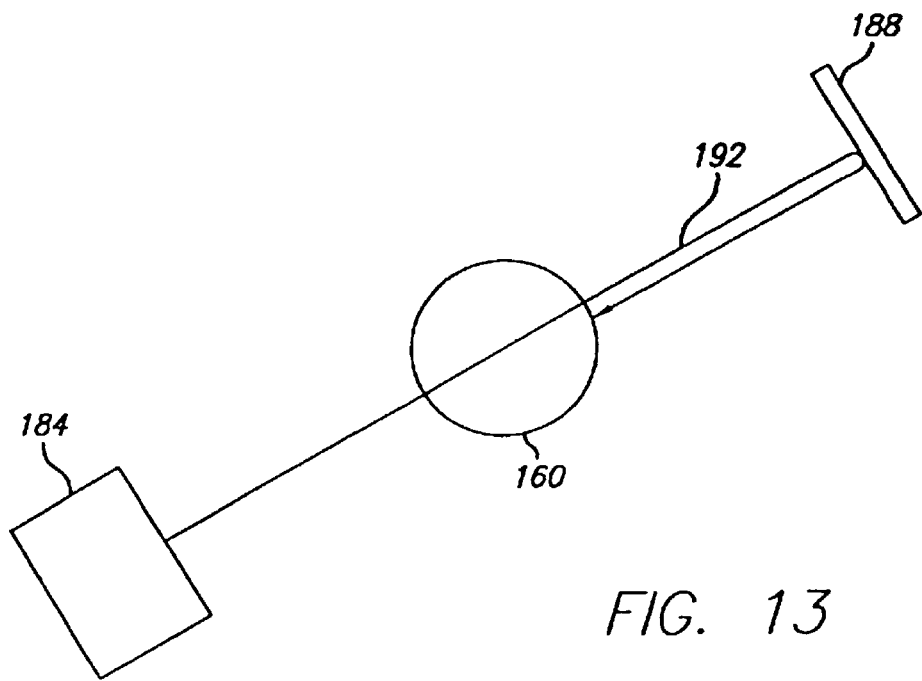
FIG. 13 is a schematic representation illustrating selected portions of a pumping module according to the present invention.
Figure 20:
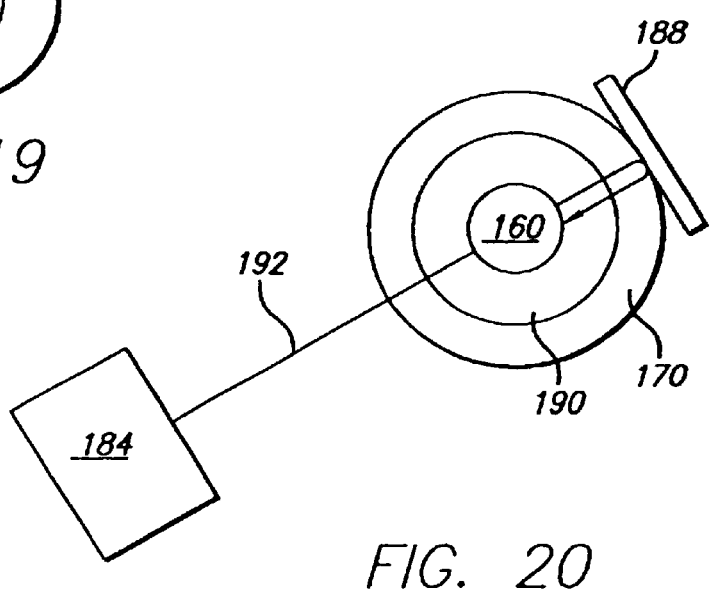
FIG. 20 is a schematic representation illustrating selected portions of a pumping module according to the present invention.

In an exemplary embodiment, the present invention provides reflective elements 188 such as, for example, optical- or metal-backed mirrors that are disposed on the other side of the laser crystal rod 160 from corresponding laser diode arrays 184. FIG. 13 illustrates an exemplary reflective element 188 disposed on the other side of the laser crystal rod 160 from the corresponding laser diode array 184. The laser diode array 184 emits light 192 which is mostly absorbed by the laser crystal rod, but some of which passes through the laser crystal rod 160. The light 192 that passes through the laser crystal rod 160 may then be reflected by the corresponding reflective element 188. The reflected light 192 impinges a second time on the laser crystal rod 160 in which the reflected light 192 may be absorbed, thereby adding to the population inversion of the laser crystal rod 160. Note that FIG. 13 merely shows one reflective element 186 and its corresponding laser diode array 184, a plurality of reflective elements 188 corresponding to a plurality of laser diode arrays 184 may be provided. In yet another exemplary embodiment, the reflective elements are disposed between adjacent laser diode arrays 184. In still yet another exemplary embodiment as illustrated in FIG. 20, the reflective element 188 is either mounted on or integrated with the tubing 170 that houses the cooling fluid 190. The deployment of properly oriented reflective elements 186 increases the pumping efficiency of the laser diode arrays 184 since emitted light that would otherwise not have been used by the laser crystal rod 160, in fact, assists in the pumping of the laser crystal rod 160.

In FIGS. 8–10, exemplary embodiments of the amplifying modules 120, 130 are illustrated according to the present invention. The amplifying modules 120, 130 each include at least one laser crystal rod 160 in which each of the laser crystal rods 160 is pumped by corresponding sets of, for example, five laser diode arrays 184. Although five laser diode arrays 184 are illustrated in FIGS. 8–10, the present invention also contemplates other quantities of laser diode arrays 184. Configurations of the amplifying modules 120, 130, each with sets of five laser diode arrays 184, deliver higher average power than configurations with lesser quantities of laser diode arrays 184 per set, for example, three laser diode arrays 184 per set. Furthermore, pumping uniformity may be improved by increasing the quantity of laser diode arrays 184 to an optimum quantity per set that surround each laser crystal rod 160.

In FIG. 9, an exemplary embodiment of the amplifying module 120, 130 is illustrated according to the present invention. In the amplifying module 120, 130, the pumping uniformity is further improved by mounting each set of the laser diode arrays 184 at an angle around the longitudinal axis of the laser crystal rod 160 with respect to the angular disposition of the other sets of laser diode arrays 184. For example, in a configuration in which a first set of five laser diode arrays 184 is disposed around a first laser crystal rod 160 in the first amplifying module 120 and in which a second set of five laser diode arrays 184 is disposed around a second laser crystal rod 160 in the second amplifying module 120, the first set may be set at 36° around the longitudinal axes of the laser crystal rods 160 with respect to the second set.

Proper positioning of the laser diode arrays 184 around the laser crystal rod 160 does not alone ensure even deposition of pumping energy. Another cause for uneven pumping is variances in the laser diodes 180. For example, the laser diodes 180 often vary in power, peak wavelength and bandwidth (e.g., approximate range of emitted wavelengths). It is very hard to obtain from commercial laser diode bar and array suppliers substantially similar performance specifications for the laser diode arrays 184 at a reasonable cost.

The non-uniformity in the output energy of the laser diode arrays 184 degrades performance of the laser amplifier 5, especially in high power and high intensity amplification. For example, the use of the laser diode array 184 having a center wavelength that is close to the peak absorption in the laser crystal rod 160 would result in more pumping energy absorption at the radial perimeter of the rod than the center of the rod. Another laser diode array 184 having a center wavelength that is farther away from the peak absorption wavelength would result in a more even distribution of pumping energy absorption throughout the laser crystal rod. Similarly, variances in the output energy intensity of the laser diode arrays 184 are undesirable because the laser diode arrays 184 having higher power output result in stronger energy absorption in the adjacent portion of the laser crystal rod 160, distorting the amplified beam and potentially creating hot spots in the laser crystal rod 160. Furthermore, such non-uniform pumping or heating may result in non-spherical lensing effects for which compensation via non-spherical lenses has proven costly.

In an exemplary embodiment, the present invention improves amplifier performance uniformity by selecting laser diode arrays 184 that closely correspond in power, wavelength and bandwidth. The laser diode arrays 184 can be adapted to match the power of the lowest power laser diode array 184. For those laser diode arrays 184 that exhibit power that is higher than that of the lowest power laser diode array 184, an electrical load may be placed in parallel with the higher power laser diode arrays 184. The parallel load drains an appropriate amount of power from the higher power arrays 184 so that all the arrays 184 use substantially the same power (i.e., all the arrays 184 are matched in power with the lowest power array 184). Parallel electrical loads may include a rheostat or a transistor or other circuitry adapted to drain the proper amount of power. The laser diode arrays 184 may be coupled in series, parallel or any combination thereof. Furthermore, the laser diode arrays 184 may share a power source or may have individual power sources. The present invention also contemplates that such systems can be manually adjusted or automatically controlled (e.g., using computers), and that such systems may include feedback loop circuitry that, for example, measures empirical output levels and then automatically adjusts the levels of electrical power delivered to each laser diode array 184 to yield balanced pumping light emissions among the operating laser diode arrays 184. The present invention also contemplates that the above-described schemes for matching power, wavelength and bandwidth of the laser diode arrays 184 are also equally applicable for matching power, wavelength and bandwidth of the laser diode bars 182 and/or the laser diodes 180.

In another exemplary embodiment, during the set up of the high power and high intensity laser system, the laser crystal rod (or the laser crystal rods) 160 can be pumped by the laser diode arrays 184 or the set of laser diode arrays 184 without the input beam 20. The light that exits the laser crystal rod 160 along its longitudinal axis can be analyzed and/or viewed to determine whether uniform pumping has been achieved. For example, the light that exits the laser crystal rod can be displayed on a visual display such that a user can see whether or not uniform pumping is being achieved. The user can then change the power levels received by, for example, the individual laser diode arrays 184 until a uniform light pattern is shown on the visual display. In one example, each laser diode array 184 is tested to determine which of the laser diode arrays 184 provides the weakest light that exits the laser crystal rod 160. Thus, for example, one laser diode array 184 pumps the laser crystal rod 160 without the input beam and the light that exits the laser crystal rod 160 along the longitudinal axis is measured and/or viewed by the user and/or analyzed by, for example, a computer. The power supplies supplying power to each of the laser diode arrays or the circuitry that controls the amount of power that reaches the laser diode arrays (e.g., power draining circuitry) can be adjusted so that light exiting the laser crystal rod 160 along the longitudinal axis has the same intensity for each of the laser diode arrays 184. Furthermore, the orientation of the laser diode arrays 184 and the set of laser diode arrays 184 around the longitudinal axis of the laser crystal rod 160 can be optimized. For example, the set of laser diode arrays 184 can pump the laser crystal rod without an input beam 20 and the light that exits the laser crystal rod 160 can be viewed and/or analyzed to determine whether the set of laser diode arrays 184 are optimally disposed with respect to the laser crystal rod 160. Furthermore, the laser diode arrays 184 can pump the laser crystal rod 160 without an input beam 20 and the light that exits the laser crystal rod 160 can be viewed and/or analyzed to determine whether or not uniform pumping is being achieved via optimally positioning each laser diode array at a particular radial angle and/or radial distance around the longitudinal axis of the laser crystal rod 160. Accordingly, uniform pumping of the laser crystal rod 160 can be set up even before the entire high power and high intensity laser system has been fully activated.

Pumping performance can be further improved by adjusting the temperature of the laser diode array 184. This adjustment is accomplished, for example, by providing a chiller that cools the fluid 190 to a controlled temperature. The wavelength of the pumping energy emitted by laser diodes 180 changes as a function of the temperature of the laser diode array 184. For example, empirical data indicates that the peak wavelength for the pumping output of arrays 184 fabricated from one type of laser diode 180 shifts by approximately 1 nm per approximately 3.5° C. change in the average diode temperature. Thus, adjustments to the average temperature of the diodes in an array allows for the tuning of the peak wavelength of the output of the laser diode arrays 184 to correspond to the optimum wavelength for pumping a particular laser crystal rod 160. When the peak wavelength of the pumping energy corresponds to the desired absorption wavelength of the laser crystal rod 160, pumping efficiency and uniformity improve.

Figure 6:
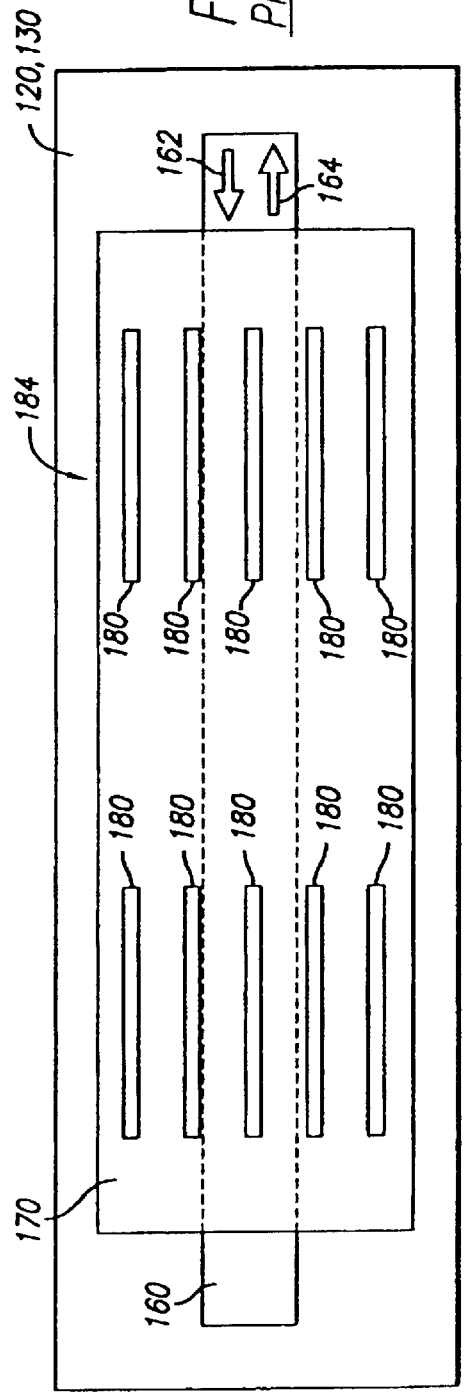
FIG. 6 is a schematic representation illustrating an amplifying module according to the present invention in which the laser diodes are in a conventional orientation.

The orientation of the laser diodes also may substantially impact the performance of the amplifier 5. As previous described, FIG. 6 illustrates a configuration for the diodes in a laser diode array 184 in which the long sides of the laser diodes 180 are oriented substantially parallel to the long sides of the face of the laser diode array 184, and the array 184 is positioned parallel to the longitudinal axis of the laser crystal rod 160. FIG. 6 can also be described as a configuration in which the long sides of the laser diodes 180 are substantially parallel to the longitudinal axis of the laser crystal rod 160.

Figure 14:
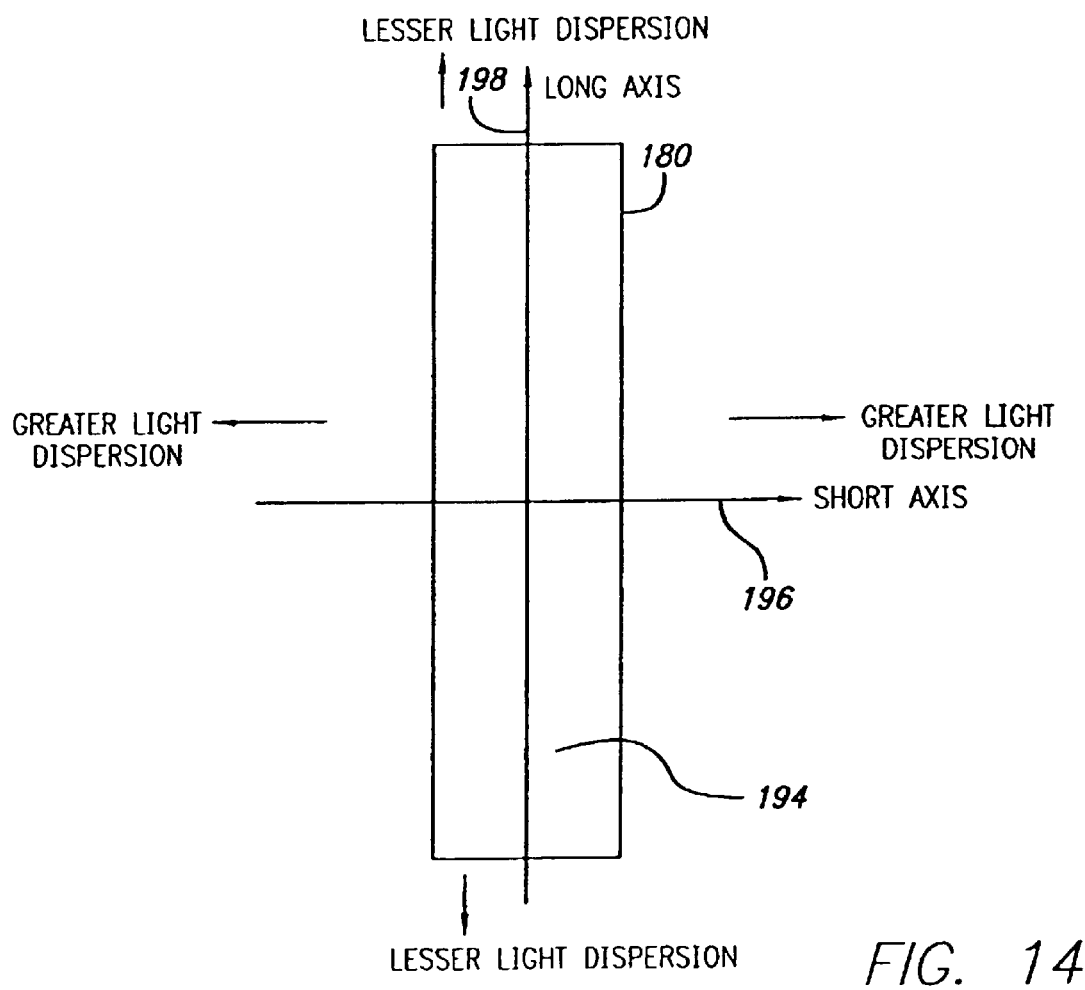
FIG. 14 is a schematic representation illustrating a laser diode according to the present invention.

As illustrated in FIG. 14, the shape of the light-emitting surface 194 of each laser diode 180 is typically an elongated rectangle. The rectangular light emitting surface of the laser diodes has two sets of sides, the short sides and the long sides. The length of the short sides is a smaller than the length of the long sides. A rectangular aperture diffracts monochromatic light with at least two diffraction angles that are roughly proportional to the wavelength of the monochromatic light and that roughly are inversely proportional to the length of a respective side of the rectangular aperture. Light dispersion through a rectangular surface beyond the "footprint" of the light emitting surface 194 is far greater along directions parallel to the short axis 196 (i.e., parallel to the short sides of the laser diode 180) than along directions parallel to the long axis 198 (i.e., parallel to the long sides of the laser diode 180). In fact, at far enough distances away from the light emitting surface 194, the dispersion due to diffraction becomes the most significant factor in determining the illumination footprint on the laser crystal rod 160. In an exemplary embodiment, the laser diode 180 is disposed with respect to the laser crystal rod 160 such that the diffraction angle of the light dispersion is, for example, between approximately 20° to approximately 60° along directions parallel to the short axis 196 and is, for example, approximately 5° to approximately 15° along directions parallel to the long axis 198.

The laser diode array 184 as illustrated in FIG. 6 is mounted facing the laser crystal rod 160 so that each laser diode has a long side that is parallel to the longitudinal axis of the laser crystal rod 160. This configuration suffers from light dispersion from the rectangular light emitting surface 194 as described above. Thus, a substantial portion of the light that is dispersed along directions parallel to the short axis does not efficiently reach the laser crystal rod 160. Furthermore, because of the insubstantial overlap of the illumination footprints along directions parallel to the long axis from adjacent diode lasers 180 on a laser diode bar 182, non-uniformities can occur, resulting in localized hot spots in the laser crystal rod 160 that degrade the performance, and possibly the operability, of the laser amplifier 5. Accordingly, the configuration may employ the use of a lensing system 200 (illustrated in FIGS. 8 and 9) to achieve more uniform pumping of the laser crystal rod 160. It is advantageous to design amplifying modules 120, 130 to operate without the lensing system 200 since lensing systems 200 increase the cost and complexity of the amplifying modules 120, 130. Furthermore, this configuration offers no redundancy in the pumping output. Accordingly, the failure of any individual laser diode 180 of laser diode array 184 may result in non-uniform pumping of the laser crystal rod 160. In such a situation, the only remedy available, which is also the most costly, might be the replacing of the entire array 184.

Figure 7:
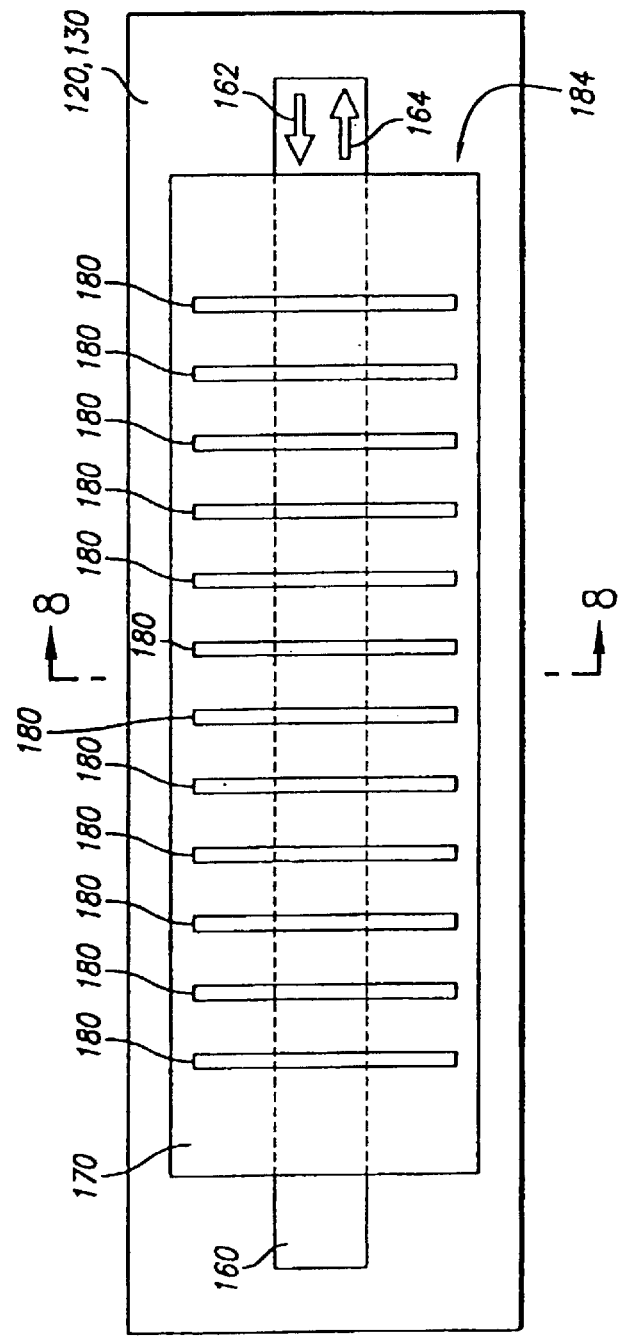
FIG. 7 is a schematic representation illustrating an amplifying module according to the present invention.

As illustrated in FIG. 7, an exemplary embodiment of the laser diode array 184 is illustrated according to the present invention. The laser diodes 180 in the laser diode array 184 are oriented with their short axes (i.e., a direction parallel with the short sides of the laser diodes 180) parallel to the longitudinal axis of the laser crystal rod 160. The configuration illustrated in FIG. 7 has an advantage in that the laser diodes 180 are more closely spaced than the configuration illustrated in FIG. 6, thus resulting in the pumping radiation being more substantially uniform due to the wide dispersion of pumping radiation in directions parallel to the short axes, which are parallel to the longitudinal axis of the laser crystal rod 160. In addition, the closer spacing allows for more laser diodes 180 to be placed in the laser array 184, thus more pumping energy may be delivered to the laser crystal rod 160. As previously discussed, illuminating the laser crystal rod 160 with more uniform pumping radiation minimizes hot spots and reduces thermal stress, non-uniform gain and other undesirable thermal optical effects. Furthermore, the need is reduced for employing the lensing system 200 in the configuration of laser diode arrays 184 as illustrated in FIG. 7 because of the substantial uniformity of the pump radiation. This configuration for the laser diode arrays 184 is also more durable than the configuration illustrated in FIG. 6 due to the substantial overlapping of the dispersed light. Accordingly, the failure of any individual laser diode 180 may be offset by power adjustments to, for example, the remaining laser diodes 180, laser diode arrays 184 or sets of laser diode arrays 184.

Empirical data indicate that the exemplary embodiment illustrated in FIG. 7 allows for higher powered pumping and greater gains from the same levels of pump energy as obtained from the exemplary embodiment illustrated in FIG. 6. For example, according to empirical data, a free running laser operation yielded a conversion rate of over approximately 35% from laser diode output power to laser output power, indicating very efficient pumping. Furthermore, high average power empirical data indicates that a water-cooled package with the configuration illustrated in FIG. 7 can handle a duty cycle exceeding approximately 20% (i.e., the laser diodes can be emitting light for approximately 20% of the time). In tests performed by Applicants, the laser diodes 180 in such a configuration were operated for approximately 200 μs and at repetition rates up to approximately 1000 Hz.

E. Lensing System

As previously described and as illustrated in FIGS. 8 and 9, the performance of the laser amplifier 5 can be further improved by using amplifying modules 120, 130 including a lensing system 200 juxtaposed to the light emitting surfaces 194 of the laser diodes 180. The lensing system 200 is adapted to guide the pump radiation from the laser diode array 184 toward the laser crystal rod 160. In an exemplary embodiment, the lensing system 200 includes a cylindrical lense (e.g., a positive cylindrical lense) and a reflector (e.g., a flat reflector). The positive cylindrical lense is configured to extend in front of the light emitting surfaces 194 of the laser diode array 184. The positive cylindrical lense focuses the slow axis of the array 184, while the flat reflector reflects the fast axis. This combination ensures that all the radiation from the array gets to the laser crystal rod 160. Thus pumping efficiency is increased, allowing greater intensity and power with the same pumping power. The lensing system 200 may include, for example, spherical lenses or aspherical lenses.

Proper positioning of the lensing system 200 is advantageous in achieving the desired pumping performance gains. For example, when the laser crystal rod 160 is at the focal points of the lensing system 200, there is strong deposition of the pumping energy in the center of the laser crystal rod 160. As a result of this strong beam intensity at the center of the laser crystal rod 160, pumping at the center is maximized, but damage to the laser crystal rod 160 and poor beam characteristics may occur above approximately 20 W. By setting the laser diodes 180 and the lensing system 200 so that the focal point of the pumping energy from the laser diodes 180 is in front of the laser crystal rod 160 rather than within it, the pumping energy diverges as it enters the laser crystal rod 160. As a result of this divergence, the deposition of pumping energy into laser crystal rod 160 is substantially more uniform. For example, tests show that the laser amplifiers 5 with this configuration can achieve output power greater than approximately 100 W without damaging the laser crystal rod 160. Further increases in the divergence of the pumping energy result in increasingly uniform deposition at the expense under certain circumstances of further limiting the total overall pumping power. With a perpendicular laser diode orientation (i.e., the short side of the individual laser diodes are parallel to the longitudinal axis of the laser crystal rod), the laser amplifier may, under certain circumstances, provide sufficiently uniform pumping energy to perform effectively even without employing the lenses and/or the mirrors.

FIG. 10 illustrates an exemplary embodiment of the present invention in which the lensing system 200 includes a unitary lense that is integrated with and runs the entire length of the tube 170 that holds the cooling fluid 190. Such a lense can be created by shaping the portion of the tube wall through which the pumping light passes to the laser crystal rod 160.

Accordingly, the geometry (e.g., shape and/or thickness) and material of the tube 170 may be adapted to form a desired lense (i.e., a positive lense that counteracts dispersion of the light emitted from the diodes). Providing such a unitary lense may provide a more robust system and may be more economical to design and fabricate.

Figure 15:
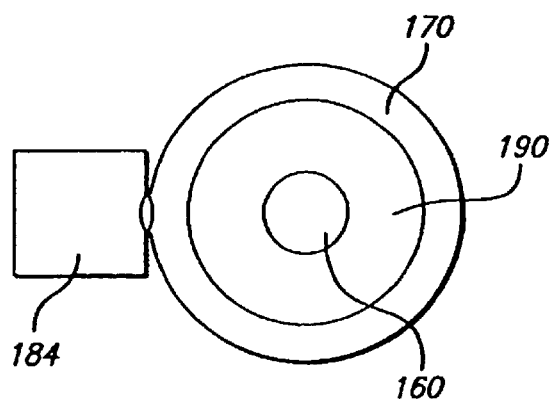
FIG. 15 is a schematic representation illustrating selected portions of a pumping module according to the present invention.

Another exemplary embodiment of the present invention is illustrated in FIG. 15 in which the lensing system 200 is mounted on the tube 170. In such a configuration, the diode array 184 may or may not be in direct contact with the lensing system 200. Furthermore, although FIG. 15 illustrates one lensing system 200 corresponding to a respective laser diode array 184, more than one lensing system 200 may be used per respective laser diode array 184. Furthermore, although FIG. 16 illustrates only one laser diode array 184, more than one laser diode array 184 may be employed according to the present invention.

VIII. Applications

Figure 17:
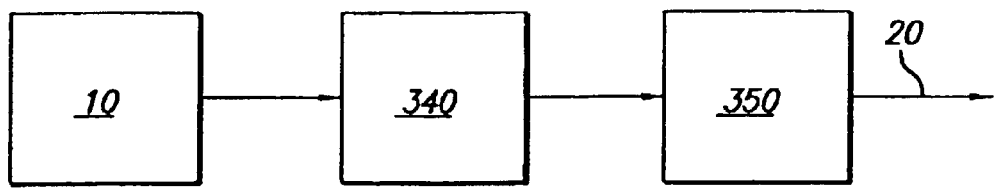
FIG. 17 is a block diagram illustrating an amplifying system according to the present invention.

In an exemplary embodiment as illustrated in block form in FIG. 17, the present invention provides for the modular development of high power and high intensity coherent light. The present invention provides that the master oscillator 10 is coupled to a pre-amplifier 340 which, in turn, is coupled to an amplifier 350 or multiple amplifiers in parallel, series or some combination thereof.

In operation, the master oscillator 10 provides, for example, approximately 1 mJ per pulse up to approximately 1 kHz. The beam profile is, for example, Gaussian with an approximately 1.2 times diffraction limited (DL) beam quality. The pulse duration ranges from approximately 150 ps to approximately several nanoseconds. For stable and consistent pulse duration, the master oscillator 10 includes the intracavity spectral filter 330 as shown in FIG. 16. Accordingly, for example, a smooth approximately 800 ps pulse with less than an approximately 5% fluctuation may be generated by the master oscillator 10. The pre-amplifier 340 is configured as the above-described laser amplifier 5 with, for example, one laser crystal rod 160. The pre-amplifier may amplify the beam 20 to over approximately 100 mJ per pulse with negligible degradation in beam quality (e.g., less than approximately 1.3 times DL beam quality). The beam 20 may then be split, if applicable, to multiple beams of, for example, approximately 10 mJ to approximately 15 mJ. The amplifier 350 is configured as the above-described laser amplifier 5 with, for example, two laser crystal rods 160. The amplifier 350 amplifies the pre-amplified beam 20 to, for example, approximately 250 mJ per pulse from an input beam of, for example, approximately 10 mJ to approximately 15 mJ, with better than approximately 2 times DL beam quality. Although FIG. 17 illustrates an exemplary embodiment in which only one amplifier 350 is provided, the present invention also contemplates additional amplifying stages coupled to the amplifier 350 where applicable. For example, in an exemplary embodiment, four parallel amplifiers are coupled to generate soft x-rays and/or extreme ultraviolet rays for use in, for example, lithography. Such high power and high intensity lasers according to the present invention may find application in many fields such as in, for example, lithography, tomography, microsopy and spectroscopy.

Figure 18:
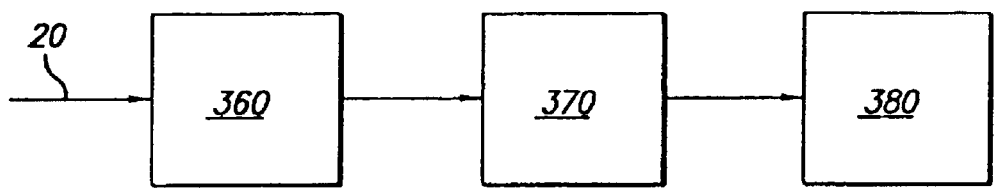
FIG. 18 is a block diagram illustrating a lithography system according to the present invention.

In an exemplary embodiment, the present invention provides a high energy point source of light for generating soft x-ray radiation and/or extreme ultraviolet (EUV) radiation (e.g., radiation having a wavelength from approximately 0.5 nm to approximately 50 nm). As shown in FIG. 18, the amplified beam 20 from the amplifier 350 with a power density exceeding approximately $10^{14}$ W/cm$^2$ can be guided to a radiation generator 360. The radiation generator 360 generates soft x-ray radiation and/or EUV radiation. The radiation generator 360 includes a constantly replenished metallic target (e.g., a moving copper tape) on which impinges the amplified beam 20. The resulting plasma then emits soft x-ray radiation and/or EUV radiation. Such soft x-ray radiation and/or EUV radiation finds application in many fields. The soft x-ray radiation and/or the EUV radiation generated according to the present invention can be used in, for example, lithography, tomography, microscopy and spectroscopy.

In an exemplary embodiment, the present invention employs the soft x-ray radiation and/or the EUV radiation in sub-micron lithography. As illustrated in FIG. 18, after the radiation generator 360 generates the soft x-ray radiation and/or the EUV radiation, it is used in a lithographic system 370. The lithographic system 370 might include, for example, a mask and optical components. The radiation impinges on the mask or optical components that direct the radiation to the mask. Further optical components may be used to guide the resulting image onto the target 380, for example, a prepared semiconductor wafer. With wavelengths in the soft x-ray and/or EUV range, lithographic machining of structures having a size of less than approximately 0.1 microns ($\mu$m) are realizable. Furthermore, by operating the laser at short pulse duration and high repetition rate, good dose control and conversion efficiency to soft x-ray radiation and/or EUV radiation may be achieved while controlling debris by generating only clusters of copper that can be easily controlled by, for example, helium gas inside the radiation generator 360.

Figure 21:
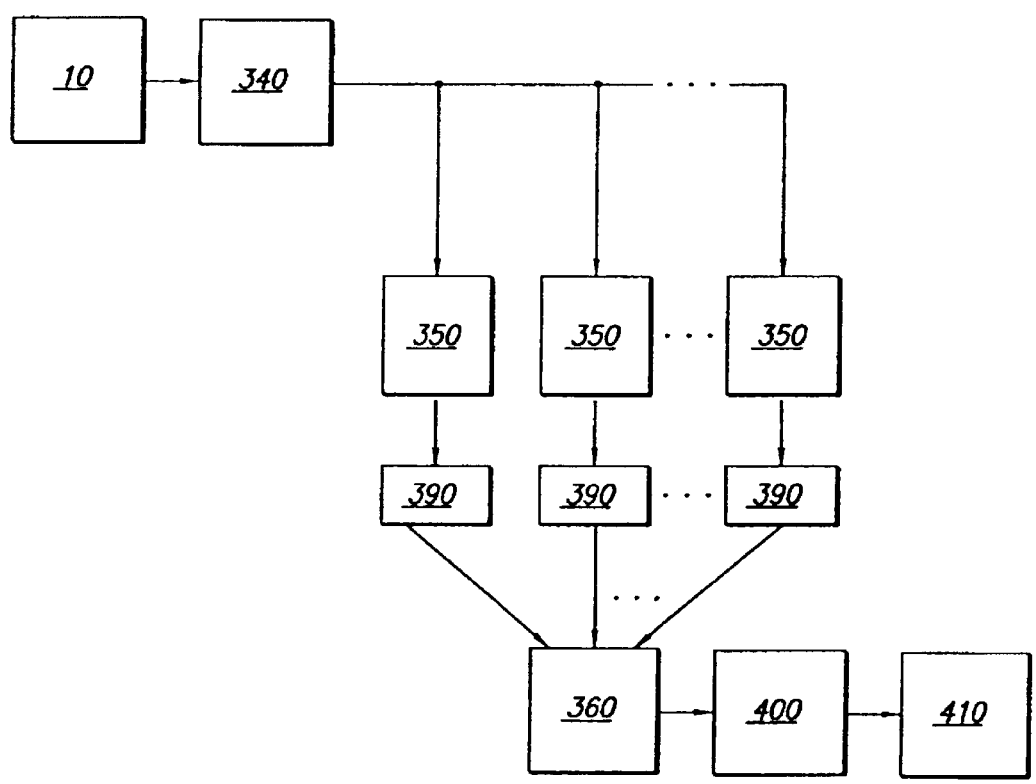
FIG. 21 is a schematic representation illustrating a lithography system according to the present invention.

In another exemplary embodiment as illustrated in FIG. 21, the beam 20 that exits the pre-amplifier 340 is split among a plurality of amplifiers 350 that are configured in parallel. After being amplified, each beam enters a corresponding harmonic generator 390 that generates a harmonic beam (e.g., a second harmonic beam). The harmonic beams then enter the radiation generator 360 and impinge upon a target (e.g., metallic target). The resulting plasma then emits soft x-ray radiation and/or EUV radiation which is then collimated into a single beam by a collimator 400. For example, the collimator 400 may collect a large solid angle of soft x-ray radiation and/or EUV radiation and reflect the radiation into a collimated beam. The collimated beam is then used in, for example, a stepper 410 of a lithography system.

High power and high intensity lasers according to the present invention also may find application in many other fields. For example, such high power and high intensity lasers may find application in micromachining, target ranging and industrial applications such as large-scale cutting, drilling and machining of a broad variety of materials including metals. In an exemplary embodiment, the present invention provides that the high power and high intensity laser is integrated with or mounted on a computer controlled robotic arm for use in an industrial setting.

Thus, it is seen that systems and methods for amplifying coherent light are provided. One skilled in the art will appreciate that the present invention can be practiced by other than the preferred embodiments which are presented in this description for the purpose of illustration and not limitation, and that the present invention is limited only by the claims that follow. It is noted that equivalents for the particular embodiments discussed in this description may be employed in order to practice the present invention as well.

What is claimed is:

1. A pumping module for pumping at least two laser crystal rods, each of the laser crystal rods having an optical axis, comprising:

a first set of laser diode arrays disposed around a first laser crystal rod, the laser diode arrays being approximately equally spaced around the first laser crystal rod, each of the laser diode arrays of the first set including laser diodes that are disposed in a plane that is substantially orthogonal to a first longitudinal axis of the laser crystal rod, the laser diodes of the first set emitting light that substantially uniformly pumps the first laser crystal rod; and a second set of laser diode arrays disposed around a second laser crystal rod, the laser diode arrays of the second set being approximately equally spaced around the second laser crystal rod, each of the laser diode arrays of the second set including laser diodes that are disposed in a plane that is substantially orthogonal to a second longitudinal axis of the second laser crystal rod, the laser diodes of the second set emitting light that substantially uniformly pumps the second laser crystal rod, wherein the first longitudinal axis and the second longitudinal axis are optically aligned along an optical axis, and wherein the second set of laser diode arrays is disposed at an angle of rotation around the optical axis with respect to the disposition of the first set of laser diode arrays around the optical axis.

2. A pumping module according to claim 1, further comprising:

a 90° rotator disposed along the optical path between the two laser crystal rods, wherein the laser crystal rods are substantially identical and are disposed on the optical axis and wherein the rotator is adapted to substantially cancel out thermally induced birefringence effects present in the laser crystal rods during substantially uniform pumping of the laser crystal rods.

3. A system for amplifying high power and high intensity laser light propagating along an optical path, comprising:

a multiple-pass amplifying module including a laser crystal rod having a longitudinal axis aligned with the optical path;

a set of laser diode arrays disposed around the laser crystal rod, the laser diode arrays being approximately equally spaced around the laser crystal rod, each of the laser diode arrays including laser diodes that are disposed in a plane that is substantially orthogonal to the longitudinal axis of the laser crystal rod, the laser diodes emitting light that substantially uniformly pumps the laser crystal rod;

a first reflector including sapphire or diamond materials; and a second reflector including sapphire or diamond materials;

wherein the multiple-pass amplifying module is disposed optically between the first reflector and the second reflector.

4. A system according to claim 3, further comprising:

a cladding layer disposed around the longitudinal axis of the laser crystal rod, the cladding layer having a substantially same refractive index as the refractive index of the laser crystal rod.

5. A four-pass optical amplifier with an optical path, comprising:

a first set of laser diode arrays disposed around a first laser crystal rod, the laser diode arrays being approximately equally spaced around the first laser crystal rod, each of the laser diode arrays of the first set including laser diodes that are disposed in a plane that is substantially orthogonal to a first longitudinal axis of the laser crystal rod, the laser diodes of the first set emitting light that substantially uniformly pumps the first laser crystal rod; and a second set of laser diode arrays disposed around a second laser crystal rod, the laser diode arrays of the second set being approximately equally spaced around the second laser crystal rod, each of the laser diode arrays of the second set including laser diodes that are disposed in a plane that is substantially orthogonal to a second longitudinal axis of the second laser crystal rod, the laser diodes of the second set emitting light that substantially uniformly pumps the second laser crystal rod;

a mirror downstream of the amplifying module; and a Faraday rotator disposed between the mirror and the amplifying module, the Faraday rotator being adapted to substantially cancel thermally induced birefringence of the amplifying module over two passes, wherein the first longitudinal axis and the second longitudinal axis are optically aligned along an optical axis, and wherein the second set of laser diode arrays is disposed at an angle of rotation around the optical axis with respect to the disposition of the first set of laser diode arrays around the optical axis.

6. A four-pass optical amplifier according to claim 5, wherein each laser crystal rod being formed from a same boule, wherein each laser crystal rod is formed from a same transverse slice of the same boule.

7. The four-pass optical amplifier according to claim 5, wherein each laser crystal rod is oriented with respect to the other laser crystal rods to reduce birefringent effects.

8. A pumping module for amplifying light that propagates along an optical path, comprising:

a laser crystal rod having a longitudinal axis, the longitudinal axis being disposed along the optical path;

a set of laser diode arrays disposed around the laser crystal rod, the laser diode arrays being approximately equally spaced around the laser crystal rod, each of the laser diode arrays including laser diodes that are disposed in a plane that is substantially orthogonal to the longitudinal axis of the laser crystal rod, the laser diodes emitting light that substantially uniformly pumps the laser crystal rod;

a lensing module disposed along the optical path, the lensing module being adapted to approximately negate thermal lensing effects present in the laser crystal rod during the pumping of the laser crystal rod; and a rotator disposed along the optical path, the rotator being adapted to approximately cancel thermally induced bireflingence effects present in the laser crystal rod during the pumping of the laser crystal rod.

9. The pumping module according to claim 8, further comprising:

a cooling system including a housing that houses a cooling fluid, the housing being disposed around at least a portion of the laser crystal rod, the cooling fluid removing heat from the laser crystal rod.

10. The pumping module according to claim 8, further comprising:

a respective cylindrical lens disposed between each laser diode array and the laser crystal rod, the cylindrical lens being configured to guide the emitted light toward the laser crystal rod.

11. The pumping module according to claim 10, wherein the cylindrical lenses are mounted on a housing of a cooling system, the housing containing a cooling fluid and being disposed around at least a portion of the laser crystal rod, the cooling fluid removing heat from the laser crystal rod.

12. The pumping module according to claim 10, wherein the cylindrical lenses are formed integrally with a housing of a cooling system by shaping a portion of the housing into a lens, the housing containing a cooling fluid and being disposed around at least a portion of the laser crystal rod, the cooling fluid removing heat from the laser crystal rod.

13. The pumping module according to claim 10, wherein the cylindrical lenses are disposed such that focal points of the cylindrical lenses are not within the laser crystal rod.

14. The pumping module according to claim 10, further comprising:

a reflector corresponding to each laser diode array, wherein the cylindrical lens focuses a slow axis of the light emitted by the corresponding laser diode array, the reflector reflecting a fast axis of the light emitted by the corresponding laser diode array.

15. The pumping module according to claim 10, wherein the cylindrical lenses are formed integrally with a cladding that is disposed around the laser crystal rod.

16. The pumping module according to claim 8, wherein each laser diode has a light emitting surface that has a substantially rectangular shape characterized by a long side and a short side, each laser diode being disposed relative to the laser crystal rod such that the short side extends in a substantially same direction as the longitudinal axis of the laser crystal rod.

17. The pumping module according to claim 16,
wherein the laser diodes are disposed such that the emitted light from approximately adjacent laser diodes substantially overlaps in pumping coverage of the laser crystal rod.

18. The pumping module according to claim 17, further comprising:
a control unit coupled to a corresponding laser diode array of the set, the control unit is configured to increase the power output of working laser diodes of the corresponding laser diode array when a particular laser diode of the corresponding laser diode array fails.

19. The pumping module according to claim 18, wherein the working laser diodes include laser diodes that are approximately adjacent to the failed diode.

20. The pumping module according to claim 17, further comprising:
a cladding layer disposed around the laser crystal rod.

21. The pumping module according to claim 20, wherein the cladding layer includes a particular material that is similar to a material in the laser crystal rod, but the particular material is undoped.

22. The pumping module according to claim 20, wherein the cladding layer does not amplify the light propagating along the optical path.

23. The pumping module according to claim 20, wherein the cladding layer includes a particular material that has substantially identical refractive index as the material of the laser crystal rod.

24. The pumping module according to claim 20, wherein the cladding layer includes means for reducing diffraction patterns of light exiting an end of the laser crystal rod.

25. The pumping module according to claim 8, wherein each laser diode has a light emitting surface that has a substantially rectangular shape characterized by a long side and a short side, each laser diode being disposed relative to the laser crystal rod such that the short side extends in a substantially parallel direction as the longitudinal axis of the laser crystal rod.

26. The pumping module according to the claim 25, wherein emitted light from approximately adjacent diodes substantially overlaps in pumping coverage due to a substantial angular dispersion in directions parallel to the short sides of the laser diodes.

27. The pumping module according to claim 8, wherein the laser diode arrays are selected to have substantially identical optical and electrical characteristics.

28. The pumping module according to claim 8, wherein the laser diode arrays are electrically connected in series.

29. The pumping module according to claim 8, further comprising:
a control unit coupled to a respective laser diode array,
wherein, if the respective laser diode array has a power output that is greater than the power output of a least powerful laser diode array, then the control unit adjusts the power output of the respective laser diode array to the power output of the least powerful laser diode array.

30. The pumping module according to claim 29, wherein the control unit includes an electrical load disposed in electrical parallel with the respective laser diode array, the electrical load is configured to remove a portion of the power from the respective laser diode array.

31. The pumping module according to claim 29, wherein the control unit includes feedback circuitry and a computer control system, the control unit automatically making power adjustments.

32. The pumping module according to claim 8, wherein the laser diodes have substantially equal power output and peak output wavelength.

33. The pumping module according to claim 8, wherein the laser diodes in a particular array are electrically connected in series.

34. The pumping module according to claim 8, further comprising:
a control module coupled to a respective laser diode,
wherein, if the respective laser diode has a power output that is greater than the power output of a least powerful laser diode, then the control module adjusts the power output of the respective laser diode to the power output of the least powerful laser diode.

35. The pumping module according to claim 34, wherein the control module includes an electrical load disposed in electrical parallel with the respective laser diode, the electrical load is configured to remove a portion of the power of the respective laser diode.

36. The pumping module according to claim 35, wherein the control module includes a computer control system, the computer control system automatically adjusting the power output of the respective laser diode.

37. The pumping module according to claim 8, further comprising:
a reflecting element disposed in the plane and opposite a respective laser diode array with respect to the laser crystal rod, the reflecting element reflecting, back to the laser crystal rod, light emitted from the respective laser diode array that passes through the laser crystal rod without contributing to the pumping of the laser diode.

38. The pumping module according to claim 37, wherein the reflecting element is mounted on a housing of a cooling system, the housing being disposed around at least a portion of the laser crystal rod and containing a cooling fluid that removes heat from the laser crystal rod.

39. The pumping module according to claim 37, wherein the reflecting element is made integral with a housing of a cooling system, the housing being disposed around at least a portion of the laser crystal rod and containing a cooling fluid that removes heat from the laser crystal rod.

40. The pumping module according to claim 37, wherein the reflecting element is disposed between two adjacent laser diode arrays.

41. The pumping module according to claim 8, wherein the pumping module is part of a pre-amplifier stage of a high power and high intensity solid state laser amplifying system.

42. The pumping module according to claim 8, wherein the pumping module is part of an amplifier stage of a high power and high intensity solid state laser amplifying system.

43. The pumping module according to claim 8, wherein the set includes an odd number of laser diode arrays.

44. The pumping module according to claim 8, wherein the laser diode arrays are disposed such that a line formed between any two laser diode arrays form does not intersect the longitudinal axis of the laser crystal rod.

45. The pumping module according to claim 8, in which either of (A) the lensing module includes a negative lens and the thermal lensing effects include a positive thermal lensing effect, or (B) the lensing module includes a positive lens and the thermal lensing effects include a negative thermal lensing effect.

46. The pumping module according to claim 8,
wherein the rotator is adapted to rotate a light polarization by approximately 90°.

47. A pumping module for amplifying light that propagates along an optical path, comprising:
a first laser crystal rod having a first longitudinal axis, the first longitudinal axis being disposed along the optical path;
a first set of laser diode arrays disposed around the first laser crystal rod, the laser diode arrays of the first set being substantially equally spaced around the first laser crystal rod, each of the laser diode arrays of the first set including laser diodes that are disposed in a plane that is substantially orthogonal to the longitudinal axis of the first laser crystal rod, the laser diodes of the first set emitting light that pumps the first laser crystal rod;
a second laser crystal rod having a second longitudinal axis, the second longitudinal axis being disposed along the optical path;
a second set of laser diode arrays disposed around the second laser crystal rod, the laser diode arrays of the second set being approximately equally spaced around the second laser crystal rod, each of the laser diode arrays of the second set including laser diodes that are disposed in a plane that is substantially orthogonal to the longitudinal axis of the first laser crystal rod, the laser diodes of the second set emitting light that pumps the second laser crystal rod;
a lensing module disposed along the optical path, the lensing module being adapted to approximately negate thermal lensing effects present in the first laser crystal rod and the second laser crystal;
a rotator disposed along the optical path and between the first laser crystal rod and the second laser crystal rod, the rotator being adapted to approximately cancel thermally induced birefringence effects present in the first laser crystal rod with the thermally induced birefringence effects of the second laser crystal rod; and
a Faraday rotator disposed along the optical path and adapted to approximately cancel cumulative birefringence effects of the first laser crystal rod and the second laser crystal rod.

48. The pumping module according to claim 47, wherein the second set of laser diode arrays is disposed at a rotation angle around the second longitudinal axis in the second plane with respect to the disposition of the first set of laser diode arrays around the first longitudinal axis in the first plane.

49. The pumping module according to claim 48, wherein the rotation angle is inversely proportional either to the number of laser diode arrays in the first set or to the number of the laser diode arrays in the second set.

50. The pumping module according to claim 47, wherein the first set and the second set each include a same odd number of laser diode arrays, the second set being rotated around the second longitudinal axis to a position with respect to the first set such that pumping uniformity is maximized with respect to the first laser crystal rod and the second laser crystal rod.

51. The pumping module according to claim 47, wherein the second set is rotated around the second longitudinal axis to a position with respect to the first set such that pumping uniformity is maximized over the first laser crystal rod and the second laser crystal rod.

52. The pumping module according to claim 47, wherein the rotator is adapted to rotate by approximately 90° a polarization of light propagating from the first laser crystal rod to the second laser crystal rod.

53. The pumping module according to claim 47,
wherein the pumping module is part of an amplifier stage of a high power and high intensity four-pass solid state laser amplifying system, and
wherein the Faraday rotator approximately cancels cumulative birefringence effects of the first laser crystal rod and the second laser crystal rod over two passes.

54. A method for substantially uniformly pumping a laser crystal rod, comprising the steps of:
arranging an odd number of laser diode arrays substantially equally spaced around the laser crystal rod;
housing laser diodes within the laser diode arrays, the laser diodes having a light emitting surface that is approximately rectangular in shape, the approximately rectangular shape being characterized by a short side and a long side;
orienting the laser diodes such that the light emitting surfaces are facing the laser crystal rod and the short sides of the light emitting surfaces extend in an approximately same direction as the longitudinal axis of the laser crystal rod; and
emitting light from the light emitting surfaces of the laser diodes toward the laser crystal rod.

55. The method according to claim 54, further comprising the step of:
selecting the laser diodes to have approximately identical electrical and optical characteristics.

56. The method according to claim 54, further comprising the step of:
adjusting a power output of a particular laser diode such that the power output of the particular laser diode matches a power output of the laser diode with the least power output.

57. The method according to claim 54, further comprising the step of:
selecting the laser diode arrays to have approximately identical electrical and optical characteristics.

58. The method according to claim 54, further comprising the step of:
adjusting a power output of a particular laser diode array such that the power output of the particular laser diode array matches a power output of the laser diode array with the least power output.

59. The method according to claim 58, wherein the step of adjusting includes the steps of placing an electrical load in electrical parallel with the particular laser diode array, draining enough power away from the particular laser diode array via the electrical load such that the power output of the particular laser diode array matches the power output of the laser diode array with the least power output.

60. A method for substantially uniformly amplifying light in a laser crystal rod, comprising:
arranging an odd number of laser diode arrays substantially equally spaced around the laser crystal rod;
housing laser diodes within the laser diode arrays, the laser diode having a light emitting surface that is approximately rectangular in shape, the approximately rectangular shape being characterized by a short side and a long side;

orienting the laser diodes such that the light emitting surfaces are facing the laser crystal rod and the short sides of the light emitting surfaces extend in an approximately same direction as the longitudinal axis of the laser crystal rod;

pumping the laser crystal rod with light emitted from the light emitting surfaces of the laser diodes;

reducing thermal lensing effects in the laser crystal rod by directing light exiting the laser crystal rod through a lens module that is adapted to reduce the thermal lensing effects; and homogenizing non-uniformities caused by thermally induced birefringence effects in the laser crystal rod by directing the light exiting the laser crystal rod through a Faraday rotator.

61. A method for substantially uniformly amplifying light that propagates along an optical path, comprising:

arranging a first set of laser diode arrays substantially equally spaced around a first laser crystal rod;

arranging a second set of laser diode arrays substantially equally spaced around a second laser crystal rod;

housing laser diodes within the laser diode arrays of the first set and the second set, each laser diode having a light emitting surface that is approximately rectangular in shape, the approximately rectangular shape being characterized by a short side and a long side;

orienting the laser diodes in the first set such that the light emitting surfaces in the first set are facing the first laser crystal rod and the short sides of the light emitting surfaces of the first set extend in an approximately same direction as the first longitudinal axis of the first laser crystal rod;

orienting the laser diodes in the second set such that the light emitting surfaces in the second set are facing the second laser crystal rod and the short sides of the light emitting surfaces of the second set extend in an approximately same direction as the second longitudinal axis of the second laser crystal rod;

pumping the first laser crystal rod with the light emitted from the light emitting surfaces of the laser diodes of the first set;

pumping the second laser crystal rod with the light emitted from the light emitting surfaces of the laser diodes of the second set;

reducing cumulative effects of thermal lensing in the first laser crystal rod and the second laser crystal rod by directing the light propagating along the optical path through a lensing module, the lensing module being adapted to reduce the thermal lensing effects; and homogenizing cumulative effects of thermally induced birefringence effects in the first laser crystal rod and the second laser crystal rod by directing the light propagating on the optical path through a Faraday rotator that rotates a light polarization.

62. A system for amplifying high power and high intensity laser light propagating along an optical path, comprising:

a first amplifier stage configured to receive a short light pulse having a particular linear polarization, the first amplifier stage including a first polarizing beam splitter being structured to pass polarization components parallel to the particular linear polarization and to reflect polarization components substantially orthogonal to the particular linear polarization;

a second polarizing beam splitter being structured to pass polarization components parallel to the particular linear polarization and to reflect polarization components substantially orthogonal to the particular linear polarization;

a directional polarization rotator disposed between the first polarizing beam splitter and the second polarizing beam splitter, the directional polarization rotator being structured to pass light propagating from the first polarizing beam splitter to the second polarizing beam splitter and to rotate by approximately 90° the polarization of the light propagating from the second polarizing beam splitter to the first polarizing beam splitter;

a pumping module including a laser crystal rod having a longitudinal axis, the longitudinal axis being disposed along the optical path, a set of laser diode arrays disposed around the laser crystal rod, the laser diode arrays being approximately equally spaced around the laser crystal rod, each of the laser diode arrays including laser diodes that are disposed in a plane that is substantially orthogonal to the longitudinal axis of the laser crystal rod, the laser diodes emitting light that pumps the laser crystal rod, a lensing module disposed along the optical path, the lensing module being adapted to approximately negate thermal lensing effects present in the laser crystal rod during the pumping of the laser crystal rod, and a rotator disposed along the optical path, the rotator being adapted to approximately homogenize thermally induced birefringence effects present in the laser crystal rod during the pumping of the laser crystal rod, a non-directional polarization rotator that includes a Faraday rotator that rotates the polarization of the light by approximately 90° over two passes;

a first reflector; and a second reflector, wherein the short light pulse passes through the first polarizing beam splitter, the directional polarization rotator and the second polarizing beam splitter without a change in polarization, wherein the second polarizing beam splitter, the first reflector, the second reflector and the non-directional polarization rotator are positioned with respect to the pumping module such that the short pulse is reflected through and amplified by the pumping module four times, wherein the first reflector and the second reflector homogenizes non-uniformities present in the pumping module by inverting the short light pulse on each pass through the pumping module, and wherein the second polarizing beam splitter, the directional polarization rotator and the first polarizing beam splitter are positioned such that the short light pulse which has been amplified at least two times through the pumping module, passes through the second polarizing beam splitter and the directional polarization rotator and is reflected out of the first amplifier stage by the first polarizing beam splitter, the directional polarization rotator rotating the polarization of the amplified short light pulse by approximately 90°.

63. The system according to claim 62, wherein the first reflector and the second reflector include a material that efficiently dissipates heat.

64. The system according to claim 63, wherein at least one of the first reflector and the second reflector is a Porro prism.

65. The system according to claim 62, wherein at least one of the first reflector and the second reflector includes a sapphire material.

66. The system according to claim 62, wherein at least one of the first reflector and the second reflector includes a diamond material.

67. The system according to claim 62, wherein at least one of the first polarizing beam splitter and the second polarizing beam splitter includes a housing on which is applied a polarizing coating.

68. The system according to claim 62, wherein at least one of the first polarizing beam splitter and the second polarizing beam splitter includes a housing having an internal polarizing coating layer.

69. The system according to claim 62, wherein at least one of the first polarizing beam splitter and the second polarizing beam splitter includes a housing having a polarizing coating layer that does not have a substantial air-coating boundary.

70. The system according to claim 62, wherein the short light pulse that is reflected out of the first amplifier stage by the first polarizing beam splitter is used for micromachining.

71. The system according to claim 62, wherein the short light pulse that is reflected out of the first amplifier stage by the first polarizing beam splitter is used for cutting or drilling.

72. The system according to claim 62, further comprising:
a second amplifier stage coupled to the first amplifier stage, the second amplifier stage receiving and amplifying the short light pulse reflected out of the first amplifier stage by the first polarizing beam splitter of the first amplifier stage.

73. The system according to claim 72, wherein the short light pulse amplified by the second amplifier stage is used for cutting or drilling.

74. The system according to claim 72, wherein the second amplifier stage is substantially identical to the first amplifier stage.

75. The system according to claim 72, wherein the second amplifier stage is similarly structured as the first amplifier stage, at least one second amplifier stage including a plurality of laser crystal rods and a plurality of sets of laser diode arrays.

76. The system according to claim 75, wherein each set of laser diode arrays are disposed in a plane that is substantially orthogonal to the optical path, each set being disposed at a rotated angle with respect to a respective adjacent set.

77. A sub-micron lithographic system, comprising:
a first amplifier stage configured to receive a short light pulse having a particular linear polarization, the first amplifier stage including
a first polarizing beam splitter being structured to pass polarization components parallel to the particular linear polarization and to reflect polarization components substantially orthogonal to the particular linear polarization;
a second polarizing beam splitter being structured to pass polarization components parallel to the particular linear polarization and to reflect polarization components substantially orthogonal to the particular linear polarization;
a directional polarization rotator disposed between the first polarizing beam splitter and the second polarizing beam splitter, the directional polarization rotator being structured to pass light propagating from the first polarizing beam splitter to the second polarizing beam splitter and to rotate by approximately 90° the polarization of the light propagating from the second polarizing beam splitter to the first polarizing beam splitter;
a pumping module including
a laser crystal rod having a longitudinal axis, the longitudinal axis being disposed along the optical path,
a set of laser diode arrays disposed around the laser crystal rod, the laser diode arrays being approximately equally spaced around the laser crystal rod, each of the laser diode arrays including laser diodes that are disposed in a plane that is substantially orthogonal to the longitudinal axis of the laser crystal rod, the laser diodes emitting light that pumps the laser crystal rod,
a lensing module disposed along the optical path, the lensing module being adapted to approximately negate thermal lensing effects present in the laser crystal rod during the pumping of the laser crystal rod, and
a rotator disposed along the optical path, the rotator being adapted to approximately homogenize thermally induced birefringence effects present in the laser crystal rod during the pumping of the laser crystal rod,
a non-directional polarization rotator that includes a Faraday rotator that rotates the polarization of the light by approximately 90° over two passes;
a first reflector; and
a second reflector,
a particular module coupled to the first amplifier stage, the particular module including a set of second amplifier stages, the second amplifier stages being placed in parallel to each other;
a radiation generator coupled to the first amplifier stage, the radiation generator including a target material; and
a collimator coupled to the radiation generator;
wherein the short light pulse passes through the first polarizing beam splitter, the directional polarization rotator and the second polarizing beam splitter without a change in polarization,
wherein the second polarizing beam splitter, the first reflector, the second reflector and the non-directional polarization rotator are positioned with respect to the pumping module such that the short pulse is reflected through and amplified by the pumping module at least four times,
wherein the first reflector and the second reflector homogenizes non-uniformities present in the pumping module by inverting the short light pulse on each pass through the pumping module,
wherein the second polarizing beam splitter, the directional polarization rotator and the first polarizing beam splitter are positioned such that the short light pulse which has been amplified at least four times through the pumping module, passes through the second polarizing beam splitter and the directional polarization rotator and is reflected out of the first amplifier stage as output light by the first polarizing beam splitter, the directional polarization rotator rotating the polarization of the amplified short light pulse by approximately 90°,
wherein the output light of the first amplifier stage enters the particular module including the set of second amplifier stages in which the output light is split among the second amplifier stages, wherein each second amplifier stage amplifies a portion of the output light, wherein the radiation generator is adapted to focus at least one light output by the particular module on the target material and to create a plasma that generates soft x-ray radiation or extreme ultraviolet radiation, and wherein the collimator is adapted to collimate at least a portion of the soft x-ray radiation or extreme ultraviolet radiation.

78. The sub-micron lithographic system according to claim 77, further comprising:

a stepper coupled to the collimator, wherein the collimator is adapted to collimate at least a portion of the soft x-ray radiation or extreme ultraviolet radiation to the stepper.

79. The system according to claim 77, wherein the particular module includes a harmonic generator coupled to each of the second amplifier stages such that, after the portions of the output light of the first amplifier stage have been amplified by the second amplifier stages, each of the harmonic generators generates harmonic light from light output by the second amplifier stages.

80. The system according to claim 79, wherein the radiation generator is adapted to focus at least one harmonic light output by the particular module on the target material and to create a plasma that generates soft x-ray radiation or extreme ultraviolet radiation.

81. The system according to claim 77, wherein the second amplifier stages are substantially identical to the first amplifier stage.

82. The system according to claim 77, wherein the second amplifier stages are similarly structured as the first amplifier stage, at least one second amplifier stage including a plurality of laser crystal rods and a plurality of sets of laser diode arrays.

83. A method for producing substantially uniform pumping of a laser crystal rod, comprising the steps of:

pumping, via one or more laser diode arrays, the laser crystal rod without an input beam, each of the laser diode arrays including laser diodes that are disposed in a plane that is substantially orthogonal to the longitudinal axis of the laser crystal rod;

viewing light output that is emitted from a longitudinal axis of the laser crystal rod on a visual display;

adjusting orientation of the one or more laser diode arrays based on the viewed light output; and adjusting power received by individual laser diode arrays based on the viewed light output.

84. The method according to claim 83, further comprising the step of:

analyzing the viewed light of individual laser diode arrays.

* * * * *